United States Patent
Ohnishi et al.

(10) Patent No.: US 10,116,228 B2
(45) Date of Patent: Oct. 30, 2018

(54) CONVERTER AND POWER CONVERSION DEVICE MANUFACTURED USING THE SAME

(71) Applicants: TOSHIBA MITSUBISHI-ELECTRIC INDUSTRIAL SYSTEMS CORPORATION, Chuo-ku (JP); Mitsubishi Electric Corporation, Chiyoda-ku (JP)

(72) Inventors: Keisuke Ohnishi, Chuo-ku (JP); Masahiro Kinoshita, Chuo-ku (JP); Kimiyuki Koyanagi, Chiyoda-ku (JP)

(73) Assignees: TOSHIBA MITSUBISHI-ELECTRIC INDUSTRIAL SYSTEMS CORPORATION, Chuo-ku (JP); Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/504,558

(22) PCT Filed: Aug. 29, 2014

(86) PCT No.: PCT/JP2014/072711
§ 371 (c)(1),
(2) Date: Feb. 16, 2017

(87) PCT Pub. No.: WO2016/031042
PCT Pub. Date: Mar. 3, 2016

(65) Prior Publication Data
US 2017/0244334 A1    Aug. 24, 2017

(51) Int. Cl.
*H02M 5/458* (2006.01)
*H02M 7/04* (2006.01)
(Continued)

(52) U.S. Cl.
CPC ............ *H02M 5/458* (2013.01); *H02M 1/08* (2013.01); *H02M 7/04* (2013.01); *H02M 2001/0054* (2013.01)

(58) Field of Classification Search
CPC ............ H02M 7/66; H02M 7/68; H02M 7/72; H02M 7/79; H02M 7/797; H02M 5/40;
(Continued)

(56) References Cited

U.S. PATENT DOCUMENTS

2011/0051478 A1*    3/2011    Sato ................ H02J 9/062
                                                363/123
2011/0170322 A1*    7/2011    Sato ................ H02J 9/062
                                                363/40
(Continued)

FOREIGN PATENT DOCUMENTS

CN    102377349 A    3/2012
CN    103378757 A    10/2013
(Continued)

OTHER PUBLICATIONS

Office Action dated Jul. 25, 2017 in Japanese Patent Application No. 2016-545185 (with English language translation).
(Continued)

*Primary Examiner* — Timothy J Dole
*Assistant Examiner* — Bryan R Perez
(74) *Attorney, Agent, or Firm* — Oblon, McClelland, Maier & Neustadt, L.L.P.

(57) ABSTRACT

A converter includes: a first transistor (Q1) connected between a first output terminal (T1) and an input terminal (T0); a second transistor (Q2) connected between the input terminal (T0) and a second output terminal (T2); first and second diodes (D1, D2) connected in anti-parallel to the first and second transistors (Q1, Q2), respectively; and a bidirectional switch that is connected between the input terminal
(Continued)

(T0) and a third output terminal (T3) and that includes third and fourth transistors (Q3, Q4) and third and fourth diodes (D3, D4). The first and second diodes (D1, D2) and the third and fourth transistors (Q3, Q4) each are formed of a wide band gap semiconductor. The third and fourth diodes (D3, D4) and the first and second transistors (Q1, Q2) each are formed of a semiconductor other than the wide band gap semiconductor.

15 Claims, 13 Drawing Sheets

(51) Int. Cl.
*H02M 1/08* (2006.01)
*H02M 1/00* (2006.01)

(58) Field of Classification Search
CPC .......... H02M 5/42; H02M 5/44; H02M 5/453; H02M 5/458; H02M 5/443; H02M 5/45; H02M 5/4505; H02M 5/451; H02M 5/452; H02M 5/45855
USPC .................................. 363/21.06, 21.14, 127
See application file for complete search history.

(56) References Cited

U.S. PATENT DOCUMENTS

| | | | |
|---|---|---|---|
| 2013/0223114 A1 | 8/2013 | Nakayama et al. | |
| 2014/0153287 A1* | 6/2014 | Mao | H02M 3/335 363/15 |
| 2015/0137784 A1* | 5/2015 | Sugawara | H02M 3/156 323/282 |
| 2016/0028224 A1 | 1/2016 | Yamada et al. | |

FOREIGN PATENT DOCUMENTS

| | | |
|---|---|---|
| CN | 103855913 A | 6/2014 |
| JP | 2001-45772 A | 2/2001 |
| JP | 2002-247862 A | 8/2002 |
| JP | 2003-303939 A | 10/2003 |
| JP | 2011-78296 A | 4/2011 |
| JP | 2013-59151 A | 3/2013 |
| JP | 2013-223357 A | 10/2013 |
| WO | 2012/056766 A1 | 5/2012 |
| WO | WO 2015/049743 A1 | 4/2015 |

OTHER PUBLICATIONS

International Search Report dated Nov. 25, 2014 in PCT/JP2014/072711 Filed Aug. 29, 2014.
Combined Canadian Office Action and Search Report dated Dec. 8, 2017 in Canadian Patent Application No. 2,959,475.
Korean Office Action dated Jun. 29, 2018 in Korean Application No. 10-2017-7006996, with English translation, 7 pages.
Chinese Office Action dated Jul. 20, 2018 in Chinese Application No. 201480081631.9, with English translation, 18 pages.
Hirofurni Uemura, Comparative Evaluation of T-Type Topologies Comprising Standard and Reverse-Blocking IGBTs, 2013 IEEE Energy Conversion Congress and Exposition. pp. 1288-1295, 10 pages.

* cited by examiner

CONVERTER AND POWER CONVERSION DEVICE MANUFACTURED USING THE SAME

TECHNICAL FIELD

The present invention relates to a converter and a power conversion device manufactured using the converter, and particularly to a converter configured to convert an alternating-current (AC) voltage into first to third direct-current (DC) voltages, and a power conversion device manufactured using the converter.

BACKGROUND ART

Japanese Patent Laying-Open No. 2011-78296 (PTD 1) discloses a converter including four transistors and four diodes, and configured to convert an AC voltage into a high voltage, a low voltage and an intermediate voltage. According to this converter, among four diodes, each of two diodes performing a reverse recovery operation is formed of a wide band gap semiconductor, thereby reducing recovery loss. Also, each of two diodes not performing a reverse recovery operation is formed of a semiconductor other than such a wide band gap semiconductor, thereby reducing cost.

CITATION LIST

Patent Document

PTD 1: Japanese Patent Laying-Open No. 2011-78296

SUMMARY OF INVENTION

Technical Problem

In the conventional converter, however, four transistors have been formed of the same type of semiconductor, still leading to higher loss and higher cost.

Therefore, a main object of the present invention is to provide a converter with reduced loss and cost, and a power conversion device manufactured using the converter.

Solution to Problem

A converter according to the present invention is configured to convert an AC voltage applied to an input terminal into a first DC voltage, a second DC voltage and a third DC voltage, and output the first DC voltage, the second DC voltage and the third DC voltage through a first output terminal, a second output terminal and a third output terminal, respectively. The converter includes: a first transistor having a first electrode and a second electrode that are connected to the first output terminal and the input terminal, respectively; a second transistor having a first electrode and a second electrode that are connected to the input terminal and the second output terminal, respectively; a first diode and a second diode connected in anti-parallel to the first transistor and the second transistor, respectively; and a first bidirectional switch connected between the input terminal and the third output terminal. The first DC voltage is higher than the second DC voltage, and the third DC voltage is an intermediate voltage between the first DC voltage and the second DC voltage. The first bidirectional switch includes a third transistor, a fourth transistor, a third diode, and a fourth diode. Each of the first diode, the second diode, the third transistor, and the fourth transistor is formed of a wide band gap semiconductor. Each of the third diode, the fourth diode, the first transistor, and the second transistor is formed of a semiconductor other than the wide band gap semiconductor.

Advantageous Effects of Invention

In the converter according to the present invention, the first and second diodes performing a reverse recovery operation, and the third and fourth transistors switching a current each are formed of a wide band gap semiconductor, so that the switching loss and the recovery loss can be reduced. Also, the third and fourth diodes not performing a reverse recovery operation, and the first and second transistors not switching a current each are formed of a semiconductor other than a wide band gap semiconductor, so that the cost can be reduced.

DESCRIPTION OF EMBODIMENTS

First Embodiment

Figure 1:
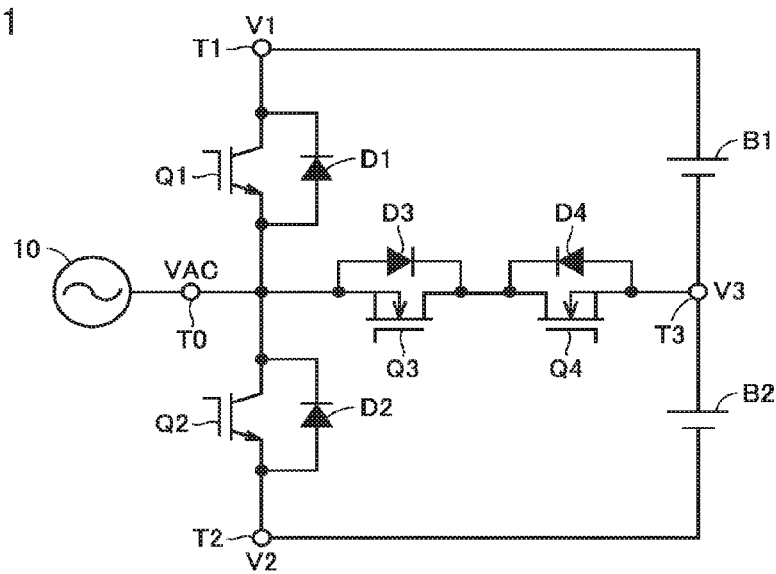
FIG. 1 is a circuit block diagram showing the configuration of a converter according to the first embodiment of the present invention.

FIG. 1 is a circuit block diagram showing the configuration of a converter according to the first embodiment of the present invention. In FIG. 1, this converter includes an input terminal T0, output terminals T1 to T3, transistors Q1 to Q4, and diodes D1 to D4.

Input terminal T0 receives an AC voltage VAC of a commercial frequency, for example, from a commercial AC power supply 10. A battery B1 has a positive electrode and a negative electrode that are connected to output terminals T1 and T3, respectively. A battery B2 has a positive electrode and a negative electrode that are connected to output terminals T3 and T2, respectively. Each of batteries B1 and B2 stores DC power. Batteries B1 and B2 are charged with the same DC voltage. Voltages on output terminals T1, T2 and T3 are defined as DC voltages V1, V2, and V3, respectively, which leads to conditions of V1>V3>V2 and V3=(V1+V2)/2. This converter serves to convert AC voltage VAC, which has been applied to input terminal T0, into DC voltages V1 to V3, and outputs the converted DC voltages V1 to V3 through output terminals T1 to T3. In addition, when output terminal T3 is grounded, DC voltages V1, V2 and V3 are to be set at a positive voltage, a negative voltage and 0V, respectively.

Each of transistors Q1 and Q2 is an insulated gate bipolar transistor (IGBT) formed using Si (silicon) that is a semiconductor other than a wide band gap semiconductor. The rated current in each of transistors Q1 and Q2 is 300 A, for example.

Each of transistors Q3 and Q4 is an N-channel MOS transistor formed using SiC (silicon carbide) that is a wide band gap semiconductor. The rated current in each of transistors Q3 and Q4 is 500 A, for example.

Each of diodes D1 and D2 is a Schottky barrier diode formed using SiC (silicon carbide) that is a wide band gap semiconductor. The rated current in each of diodes D1 and D2 is, for example, 600 A that is greater than the rated current in each of transistors Q1 to Q4 and diodes D3 and D4.

Each of diodes D3 and D4 is formed using Si (silicon) that is a semiconductor other than a wide band gap semiconductor. The rated current in each of diodes D3 and D4 is 450 A, for example.

In this way, transistors Q1 and Q2 are different in specification from transistors Q3 and Q4, and diodes D1 and D2 are different in specification from diodes D3 and D4, the reason for which will be described later.

Transistor Q1 has: a collector (the first electrode) connected to output terminal T1 (the first output terminal); and an emitter (the second electrode) connected to input terminal T0. Diode D1 has: an anode connected to input terminal T0; and a cathode connected to output terminal T1. In other words, diode D1 is connected in anti-parallel to transistor Q1.

Transistor Q2 has: a collector (the first electrode) connected to input terminal T0; and an emitter (the second electrode) connected to output terminal T2 (the second output terminal). Diode D2 has: an anode connected to output terminal T2; and a cathode connected to input terminal T0. In other words, diode D2 is connected in anti-parallel to transistor Q2.

Transistors Q3 and Q4 have: drains (the second electrodes) that are connected to each other; and sources (the first electrodes) that are connected to input terminal T0 and output terminal T3 (the third output terminal), respectively. Diodes D3 and D4 have: cathodes that are connected to drains of transistors Q3 and Q4, respectively; and anodes that are connected to input terminal T0 and output terminal T3, respectively. In other words, diodes D3 and D4 are connected in anti-parallel to transistors Q3 and Q4, respectively. Transistors Q3, Q4 and diodes D3, D4 form the first bidirectional switch.

Figure 2:
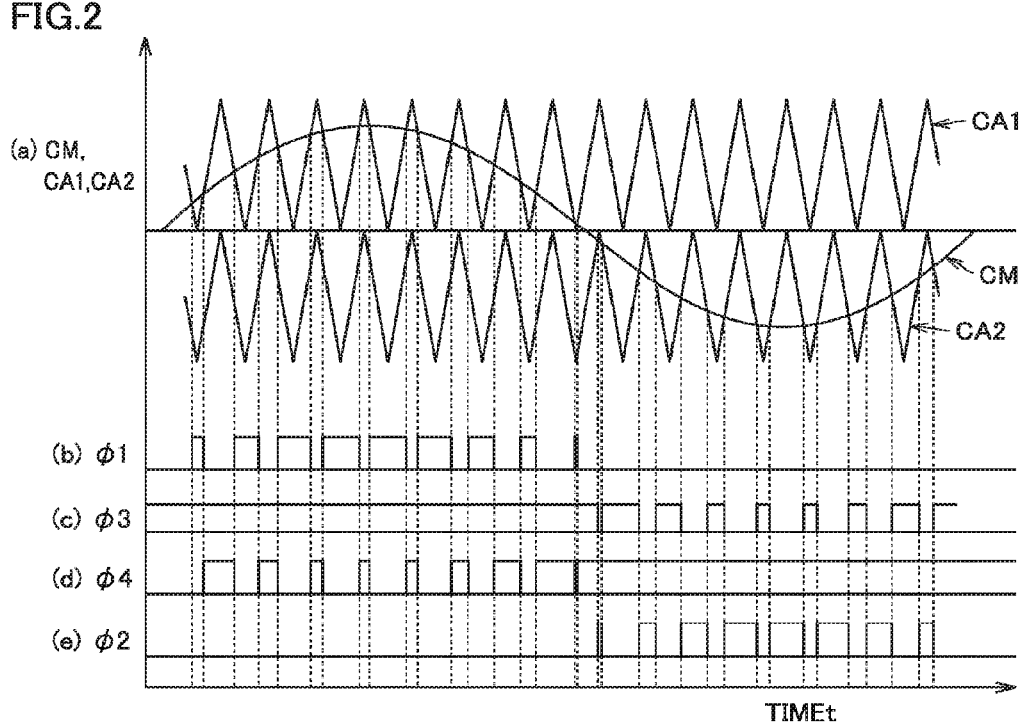
FIG. 2 is a time chart showing waveforms of four PWM signals that control four transistors, respectively, shown in FIG. 1.

Then, the operation of this converter will be hereinafter described. Transistors Q1 to Q4 have gates to which PWM signals φ1 to φ4, respectively, are supplied. FIGS. 2(a) to 2(e) each show a method of generating PWM signals φ1 to φ4, and waveforms. Specifically, FIG. 2(a) shows waveforms of a sinusoidal wave command value signal CM, a positive-side triangular wave carrier signal CA1 and a negative-side triangular wave carrier signal CA2. FIGS. 2(b), 2(c), 2(d), and 2(e) show the waveforms of PWM signals φ1, φ3, φ4, and φ2, respectively.

In FIGS. 2(a) to 2(e), the frequency of sinusoidal wave command value signal CM is a commercial frequency, for example. The phase of sinusoidal wave command value signal CM is the same as the phase of AC voltage VAC of the commercial frequency, for example. Carrier signals CA1 and CA2 show the same cycle and the same phase. The cycles of carrier signals CA1 and CA2 are sufficiently smaller than the cycle of sinusoidal wave command value signal CM.

The high-low levels of sinusoidal wave command value signal CM and positive-side triangular wave carrier signal CA1 are compared with each other. When the level of sinusoidal wave command value signal CM is higher than the level of positive-side triangular wave carrier signal CAL PWM signals φ1 and φ4 are set at an "H" level and an "L" level, respectively. When the level of sinusoidal wave command value signal CM is lower than the level of positive-side triangular wave carrier signal CAL PWM signals φ1 and φ4 are set at an "L" level and an "H" level, respectively.

Accordingly, in a time period during which the level of sinusoidal wave command value signal CM is positive, PWM signals 41 and 44 are alternately set at an "H" level in synchronization with carrier signal CA1, and thus, transistors Q1 and Q4 are alternately turned on. Furthermore, in a time period during which the level of sinusoidal wave command value signal CM is negative, PWM signals φ1 and φ4 are fixed at an "L" level and an "H" level, respectively, and thus, transistor Q1 is fixed in the OFF state while transistor Q4 is fixed in the ON state.

The high-low levels of sinusoidal wave command value signal CM and negative-side triangular wave carrier signal CA2 are compared with each other. When the level of sinusoidal wave command value signal CM is higher than the level of positive-side triangular wave carrier signal CA2, PWM signals φ2 and φ3 are set at an "L" level and an "H" level, respectively. When the level of sinusoidal wave command value signal CM is lower than the level of positive-side triangular wave carrier signal CA2, PWM signals φ2 and φ3 are set at an "H" level and an "L" level, respectively.

Therefore, in a time period during which the level of sinusoidal wave command value signal CM is positive, PWM signals φ2 and φ3 are fixed at an "L" level and an "H" level, respectively, and thus, transistor Q2 is fixed in the OFF state while transistor Q3 is fixed in the ON state. Furthermore, in a time period during which the level of sinusoidal wave command value signal CM is negative, PWM signals φ2 and φ3 are alternately set at an "H" level in synchronization with carrier signal CA2, and thus, transistors Q2 and Q3 are alternately turned on.

The ratio between the time in which the PWM signal is set at an "H" level within one cycle and the time of one cycle of the PWM signal is referred to as a duty ratio. In a time period during which the level of sinusoidal wave command value signal CM is positive, the duty ratio of PWM signal φ1 is maximized in the vicinity of a positive peak (90 degrees) of sinusoidal wave command value signal CM. Also, the duty ratio of PWM signal φ1 decreases with increasing distance from the peak, and reaches 0 in the vicinity of 0 degree and 180 degrees. The duty ratio of PWM signal φ1 is fixed at 0 in a time period during which sinusoidal wave command value signal CM is negative. PWM signal φ4 is a complementary signal of PWM signal φ1.

The duty ratio of PWM signal φ2 is fixed at 0 in a time period during which the level of sinusoidal wave command value signal CM is positive. The duty ratio of PWM signal φ2 is maximized in the vicinity of a negative peak (270 degrees) of sinusoidal wave command value signal CM. Also, the duty ratio of PWM signal φ2 decreases with increasing distance from the peak, and reaches 0 in the vicinity of 180 degrees and 360 degrees. PWM signal φ3 is a complementary signal of PWM signal φ2.

Figure 3:
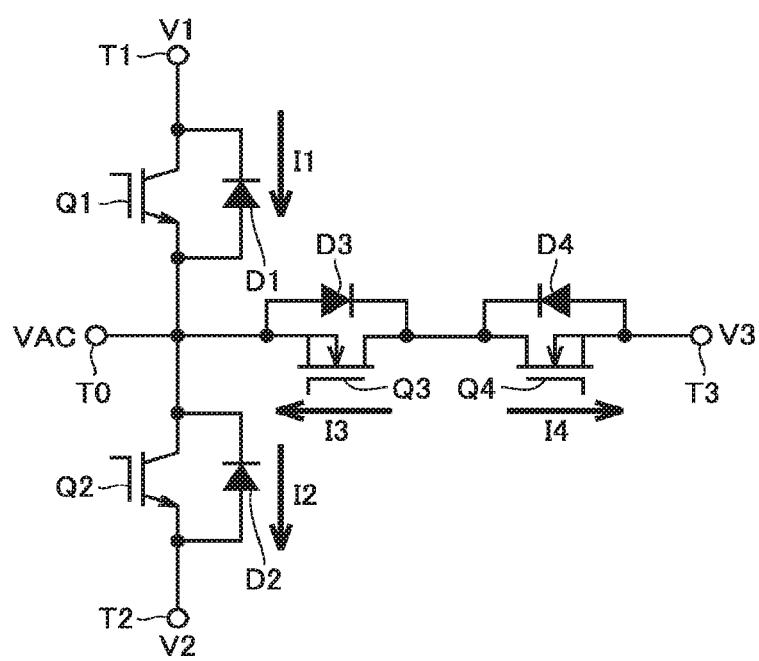
FIG. 3 is a circuit diagram for illustrating a current flowing through a converter shown in FIG. 1.

Then, the current flowing through each of transistors Q1 to Q4 and diodes D1 to D4 during the operation of the converter will be hereinafter described. As shown in FIG. 3, the current flowing from output terminal T1 into input terminal T0 is defined as I1; the current flowing from input terminal T0 into output terminal T2 is defined as I2; the current flowing from output terminal T3 into input terminal T0 is defined as I3; and the current flowing from input terminal T0 into output terminal T3 is defined as I4.

Figure 4:
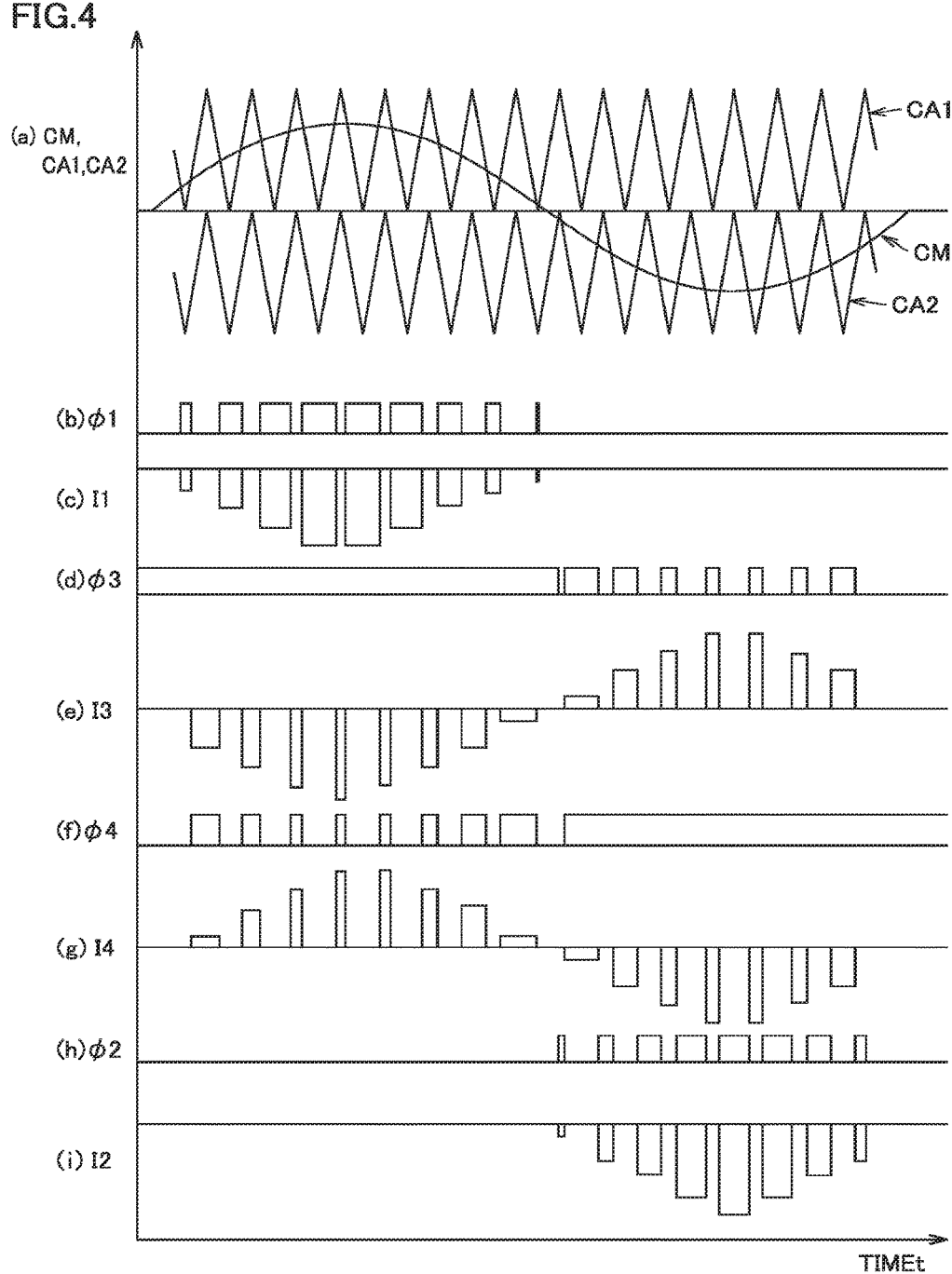
FIG. 4 is a time chart showing the current flowing through the converter shown in FIG. 1.

FIGS. 4(a) to 4(i) are time charts each showing the operation of the converter. Specifically, FIG. 4(a) shows waveforms of sinusoidal wave command value signal CM, positive-side triangular wave carrier signal CA1 and negative-side triangular wave carrier signal CA2. FIGS. 4(b), 4(d), 4(f), and 4(h) show waveforms of PWM signals φ1, φ3, φ4, and φ2, respectively, and FIGS. 4(c), 4(e), 4(g), and 4(i) show waveforms of currents I1, I3, I4, and I2, respectively. Among currents I1 to I4, a positive current shows the current flowing through transistor Q while a negative current shows the current flowing through diode D. The figures also show the case where the power factor is 1.0, in which the phase of sinusoidal wave command value signal CM matches with the phase of AC voltage VAC.

In FIGS. 4(a) to 4(i), in a time period during which the level of sinusoidal wave command value signal CM is positive, PWM signals φ3 and φ2 are fixed at an "H" level and an "L" level, respectively, and PWM signals φ1 and φ4 are alternately set at an "H" level. Accordingly, transistors Q3 and Q2 are fixed in an ON state and an OFF state, respectively, and transistors Q1 and Q4 are alternately turned on. Thus, a current flows from input terminal T0 alternately into output terminals T1 and T3.

During this time period, when transistor Q4 is turned off, current T1 of the level corresponding to the level of AC voltage VAC flows from input terminal T0 through diode D1 into output terminal T1; and when transistor Q4 is turned on, current I4 of the level complementing current I1 flows on a passage extending from input terminal T0 through transistors Q3 and Q4 to output terminal T3.

Since transistor Q2 is fixed in the OFF state, a current does not flow through transistor Q2, so that switching loss does not occur in transistor Q2. Although transistor Q1 is turned on/off, a current flows through diode D1 and a current does not flow through transistor Q1, so that switching loss does not occur in transistor Q1. Since transistor Q3 is fixed in the ON state, a current flows through transistor Q3, but switching loss does not occur in transistor Q3. Accordingly, during this time period, among diodes D1 to D4 and transistors Q1 to Q4, the current flowing through diode D1 shows the largest effective value while the greatest switching loss occurs in transistor Q4.

Each time transistor Q4 is changed from the OFF state to the ON state, a reverse bias voltage is applied to diode D1, and this diode D1 performs a reverse recovery operation. No current flows through diodes D2 and D4 during this time period.

In a time period during which the level of sinusoidal wave command value signal CM is negative, PWM signals φ4 and φ1 are fixed at an "H" level and an "L" level, respectively, and PWM signals φ2 and φ3 are alternately set at an "H" level. Accordingly, transistors Q4 and Q1 are fixed in the ON state and the OFF state, respectively, and transistors Q2 and Q3 are alternately turned on, and thus, a current flows alternately from output terminals T2 and T3 into input terminal T0.

During this time period, when transistor Q3 is turned off, current I2 of the level corresponding to the level of AC voltage VAC flows from output terminal T2 through diode D2 into input terminal T0; and when transistor Q3 is turned on, current I3 of the level complementing current I2 flows through a passage extending from output terminal T3 via transistors Q4 and Q3 to output terminal T0.

Since transistor Q1 is fixed in the OFF state, a current does not flow through transistor Q1, and thus, switching loss does not occur in transistor Q1. Although transistor Q2 is turned on/off, a current flows through diode D2 while a current does not flow through transistor Q2, with the result that switching loss does not occur in transistor Q2. Since transistor Q4 is fixed in the ON state, a current flows through transistor Q4, but switching loss does not occur in transistor Q4. Accordingly, during this time period, among diodes D1 to D4 and transistors Q1 to Q4, the current flowing through diode D2 shows the largest effective value, and the greatest switching loss occurs in transistor Q3.

Furthermore, each time transistor Q3 is changed from the OFF state to the ON state, a reverse bias voltage is applied to diode D2, and this diode D2 performs a reverse recovery operation. Also, no current flows through other diodes D1 and D3 during this time period.

In summary, a large current flows through diodes D1 and D2, and these diodes D1 and D2 each perform a reverse recovery operation. A current flowing through diodes D3 and D4 is smaller than the current flowing through diodes D1 and D2, and thus, these diodes D3 and D4 each do not perform a reverse recovery operation. No current flows through transistors Q1 and Q2, so that switching loss does not occur in transistors Q1 and Q2. A current flows through transistors Q3 and Q4, so that switching loss occurs in transistors Q3 and Q4.

Thus, as described above, as transistors Q3 and Q4, an N-channel MOS transistor is employed that is formed of SiC as a wide band gap semiconductor and that has a rated current of a large value (for example, 500 A), thereby reducing switching loss. Furthermore, as transistors Q1 and Q2, an IGBT is employed that is formed of Si as a semiconductor other than a wide band gap semiconductor and that has a rated current of a small value (for example, 300 A), thereby reducing cost.

As diodes D1 and D2, a Schottky barrier diode is employed that is formed of SiC as a wide band gap semiconductor and that has a rated current of a large value (for example, 600 A), thereby reducing recovery loss during the reverse recovery operation. As diodes D3 and D4, a diode is employed that is formed of Si as a semiconductor other than a wide band gap semiconductor and that has a rated current of a small value (for example, 450 A), thereby reduction cost.

Figure 5:
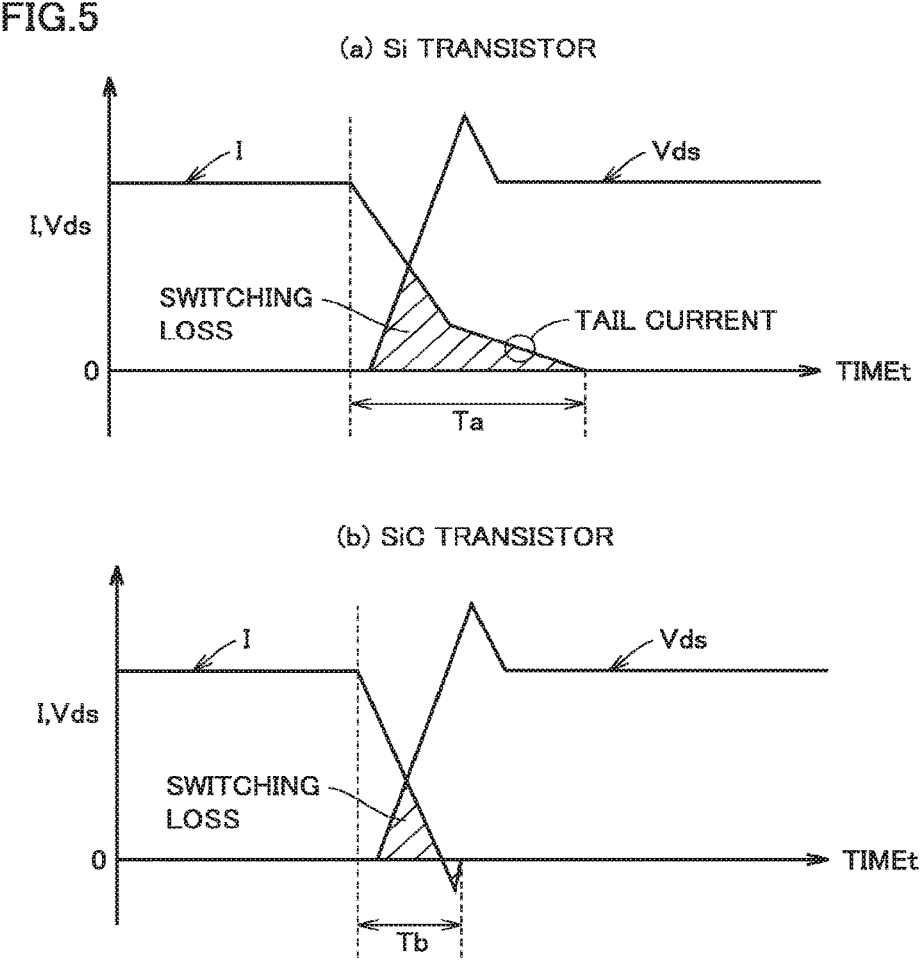
FIG. 5 is a time chart for illustrating switching loss in each of two types of transistors shown in FIG. 1.

FIG. 5(a) is a time chart showing the switching operation of an N-channel MOS transistor formed using Si (which will be referred to as a Si transistor). FIG. 5(b) is a time chart showing the switching operation of an N-channel MOS transistor formed using SiC (which will be referred to as a SiC transistor).

In FIGS. 5(a) and 5(b), in the initial state, a gate signal (not shown) is set at an "H" level to turn on the transistor, to cause a fixed current I to flow through the transistor, in which case a drain-source voltage Vds is set at 0V. When the gate signal is lowered from an "H" level to an "L" level at a certain time to turn off the transistor, current I decreases and voltage Vds increases.

As apparent from FIGS. 5(a) and 5(b), a time period Ta in the Si transistor from when current I starts to fall until when current I reaches 0 A is longer than a time period Tb in the SiC transistor from when current I starts to fall until when current I reaches 0 A. In the Si transistor, current I decreases quickly until this current I reaches a certain value. From this certain value, however, it takes long for current I to reach 0 A. The current flowing in a time period during which this current reaches 0 A from such a certain value is referred to as a tail current.

On the other hand, in the SiC transistor, current I decreases immediately and some overshoot occurs. The switching loss in the transistor is represented by a product of current I and voltage Vds, which corresponds to an area of the diagonally shaded region in the figure. Accordingly, the switching loss in the SiC transistor is smaller than the switching loss in the Si transistor.

Figure 6:
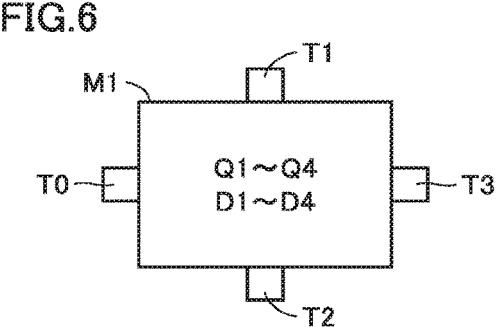
FIG. 6 is a block diagram showing the configuration of a semiconductor module included in the converter shown in FIG. 1.

FIG. 6 is a diagram showing the external appearance of the converter shown in FIG. 1. In FIG. 6, the converter includes one semiconductor module M1. Semiconductor module M1 is provided on its inside with transistors Q1 to Q4 and diodes D1 to D4. Semiconductor module M1 is provided on its outside with an input terminal T0 and output terminals T1 to T3. Furthermore, semiconductor module M1 is provided on its outside with four signal terminals used for supplying PWM signals ϕ1 to ϕ4 to the gates of transistors Q1 to Q4, respectively, but these four signal terminals are not shown for simplification of illustration of the figure.

Figure 7:
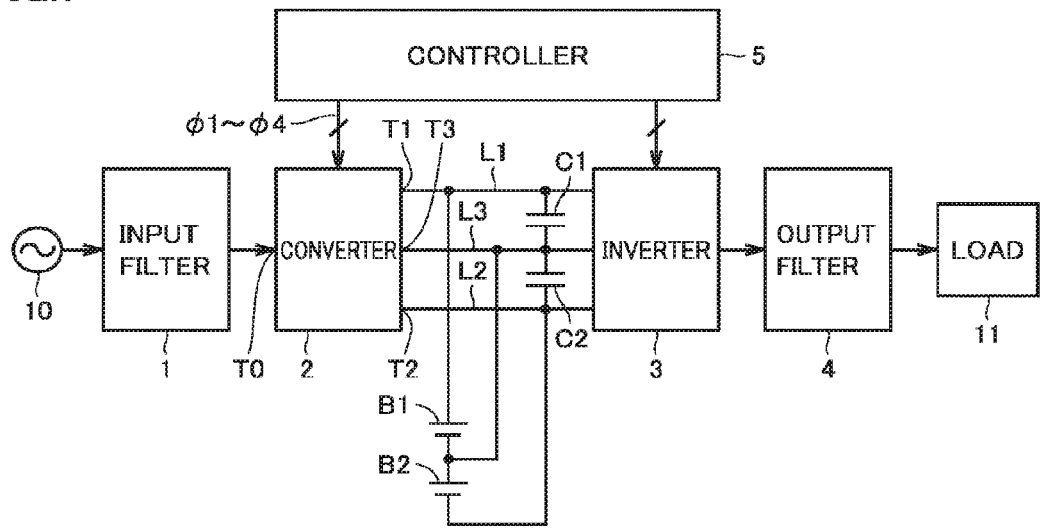
FIG. 7 is a circuit block diagram showing the configuration of an uninterruptible power supply device including the converter shown in FIG. 1.

FIG. 7 is a circuit block diagram showing the configuration of an uninterruptible power supply device including the converter shown in FIG. 1. In FIG. 7, the uninterruptible power supply device includes an input filter 1, a converter 2, a DC positive bus L1, a DC negative bus L2, a DC neutral point bus L3, capacitors C1, C2, an inverter 3, an output filter 4, and a controller 5.

Input filter 1 serves as a low pass filter to allow the AC power of a commercial frequency from commercial AC power supply 10 to flow into input terminal T0 of converter 2, and to prevent the signal of a carrier frequency generated in converter 2 from passing through to commercial AC power supply 10.

DC positive bus L1, DC negative bus L2 and DC neutral point bus L3 have: one ends connected to output terminals T1, T2 and T3, respectively, of converter 2; and the other ends connected to three input terminals, respectively, of inverter 3. Capacitor C1 is connected between buses L1 and L3 while capacitor C2 is connected between buses L3 and L2. Buses L1 and L3 are connected to the positive electrode and the negative electrode, respectively, of battery B1 while buses L3 and L2 are connected to the positive electrode and the negative electrode, respectively, of battery B2.

As shown in FIG. 1, converter 2 includes an input terminal T0, output terminals T1 to T3, transistors Q1 to Q4, and diodes D1 to D4, and is controlled by PWM signals ϕ1 to ϕ4 from controller 5.

In the normal situation in which AC power is normally supplied from commercial AC power supply 10, converter 2 converts the AC power supplied from commercial AC power supply 10 through input filter 1 into DC power, and supplies the converted DC power to each of batteries B1 and B2 and also to inverter 3. Each of batteries B1 and B2 stores DC power.

In other words, converter 2 is controlled by PWM signals ϕ1 to ϕ4 supplied from controller 5, to generate DC voltages V1 to V3 based on AC voltage VAC supplied from commercial AC power supply 10 through input filter 1, and then, applies generated DC voltages V1, V2 and V3 to DC positive bus L1, DC negative bus L2 and DC neutral point bus L3, respectively. In addition, when output terminal T3 is grounded, DC voltages V1, V2 and V3 are set at a positive voltage, a negative voltage and 0V, respectively. DC voltages V1 to V3 are smoothed by capacitors C1 and C2. DC voltages V1 to V3 are supplied to batteries B1, B2 and inverter 3. Converter 2 is stopped at the time of power interruption during which supply of the AC power from commercial AC power supply 10 is stopped.

In the normal situation in which AC power is normally supplied from commercial AC power supply 10, inverter 3 converts the DC power generated in converter 2 into AC power. Also, at the time of power interruption during which supply of the AC power from commercial AC power supply 10 is stopped, inverter 3 converts the DC power on each of batteries B1 and B2 into AC power.

In other words, in the normal situation, inverter 3 generates a three-level AC voltage based on DC voltages V1 to V3 supplied from converter 2 through buses L1 to L3. During power interruption, inverter 3 generates a three-level AC voltage based on DC voltages V1 to V3 supplied from batteries B1 and B2 through buses L1 to L3.

Output filter 4 is connected between the output terminal of inverter 3 and a load 11. Output filter 4 serves as a low pass filter to allow the AC power of a commercial frequency included in the AC power output from inverter 3 to flow into load 11, and also to prevent the signal of a carrier frequency generated in inverter 3 from passing through to load 11. In other words, output filter 4 converts the output voltage of inverter 3 into a sinusoidal wave of a commercial frequency, and supplies the converted sinusoidal wave to load 11.

Controller 5 is configured to control converter 2 and inverter 3 by supplying a PWM signal while monitoring the AC voltage from commercial AC power supply 10, the AC voltage output to load 11, and DC voltages V1 to V3, and the like.

Then, the operation of this uninterruptible power supply device will be hereinafter described. In the normal situation in which AC power is normally supplied from commercial AC power supply 10, the AC power from commercial AC power supply 10 is supplied to converter 2 through input filter 1, and converted into DC power by converter 2. The DC power generated by converter 2 is stored in batteries B1 and B2 and also supplied to inverter 3 and converted by this inverter 3 into AC power of a commercial frequency. The AC power generated by inverter 3 is supplied to load 11 through output filter 4, thereby operating load 11.

At the time of power interruption during which supply of the AC power from commercial AC power supply 10 is stopped, the operation of converter 2 is stopped, and the DC power from each of batteries B1 and B2 is supplied to inverter 3 and converted by inverter 3 into AC power of a commercial frequency. The AC power generated in inverter 3 is supplied to load 11 through output filter 4 so as to continue the operation of load 11.

Accordingly, even when power interruption occurs, the operation of load 11 is continued as long as DC power is stored in each of batteries B1 and B2. When supply of the AC power from commercial AC power supply 10 is resumed, the operation of converter 2 is resumed. Then, the DC power generated in converter 2 is supplied to each of batteries B1, B2 and inverter 3, so that its original state is brought back.

As described above, in the present first embodiment, a Schottky barrier diode formed of a wide band gap semiconductor is used as diodes D1 and D2 performing a reverse recovery operation, and also, a diode formed of a semiconductor other than a wide band gap semiconductor is used as diodes D3 and D4 not performing a reverse recovery operation. Accordingly, the recovery loss and the cost can be reduced.

Furthermore, an N-channel MOS transistor formed of a wide band gap semiconductor is used as transistors Q3 and Q4 turning on/off a current. Also, an IGBT formed of a semiconductor other than a wide band gap semiconductor is used as transistors Q1 and Q2 not turning on/off a current. Accordingly, the switching loss and the cost can be reduced.

In addition, SiC is used as a wide band gap semiconductor in the present first embodiment, but not limited thereto, and any other semiconductors may be used as long as such semiconductors are a wide band gap semiconductor. For example, GaN (gallium nitride) may be used as a wide band gap semiconductor.

Figure 8:
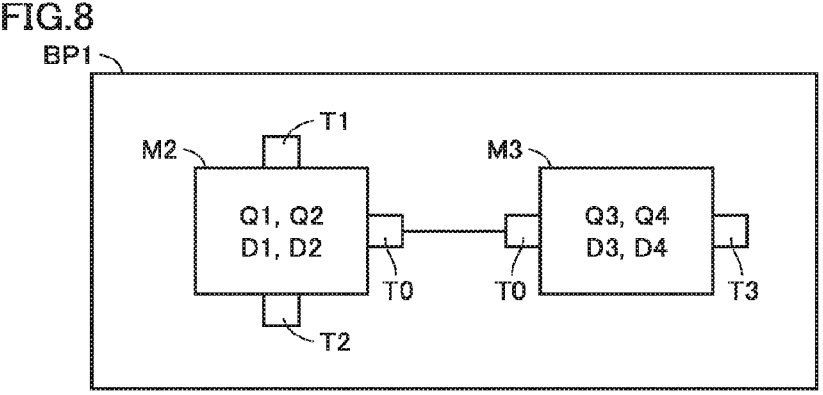
FIG. 8 is a circuit block diagram showing a modification of the first embodiment.

FIG. 8 is a block diagram showing a modification of the first embodiment, which is shown as compared with FIG. 6. In FIG. 8, in the present modification, a converter includes a substrate BP1, and two semiconductor modules M2 and M3 mounted on its surface. Semiconductor module M2 is provided on its inside with transistors Q1, Q2 and diodes D1, D2. Semiconductor module M2 is provided on its outside with an input terminal T0 and output terminals T1, T2. Furthermore, semiconductor module M2 is provided on its outside with two signal terminals (not shown) used for supplying PWM signals $\phi1$ and $\phi2$ to the gates of transistors Q1 and Q2.

Semiconductor module M3 is provided on its inside with transistors Q3, Q4 and diodes D3, D4. Semiconductor module M3 is provided on its outside with an input terminal T0 and an output terminal T3. Semiconductor module M3 is provided on its outside with two signal terminals (not shown) used for supplying PWM signals $\phi3$ and $\phi4$ to the gates of transistors Q3 and Q4. Input terminal T0 of semiconductor module M2 and input terminal T0 of semiconductor module M3 are connected to each other. The same effect as that in the first embodiment can be achieved also in the present modification.

Figure 9:
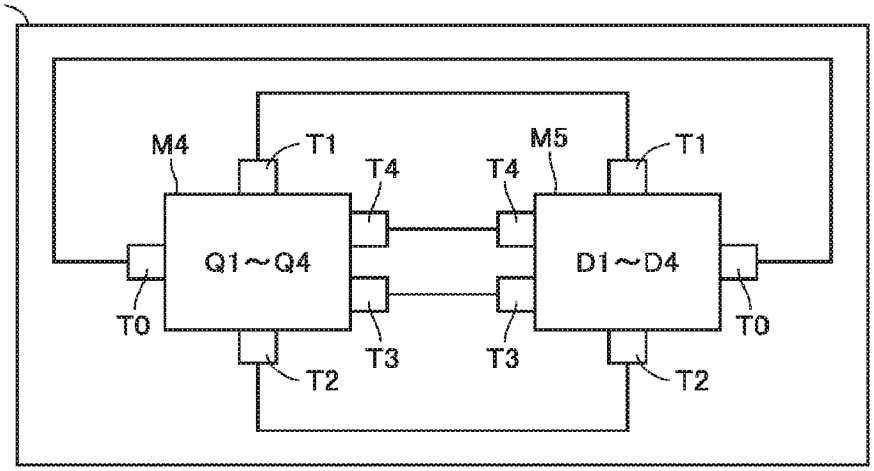
FIG. 9 is a circuit block diagram showing another modification of the first embodiment.

FIG. 9 is a block diagram showing another modification of the first embodiment, which is shown as compared with FIG. 6. In FIG. 9, in the present modification, a converter includes a substrate BP2, and two semiconductor modules M4 and M5 mounted on its surface. Semiconductor module M4 is provided on its inside with transistors Q1 to Q4. Semiconductor module M4 is provided on its outside with an input terminal T0, output terminals T1 to T3, and an intermediate terminal T4. Intermediate terminal T4 is connected to each of drains of transistors Q3 and Q4. Semiconductor module M4 is provided on its outside with four signal terminals (not shown) used for supplying PWM signals $\phi1$ to $\phi4$ to the gates of transistors Q1 and Q4.

Semiconductor module M5 is provided on its inside with diodes D1 to D4. Semiconductor module M5 is provided on its outside with an input terminal T0, output terminals T1 to T3, and an intermediate terminal T4. Intermediate terminal T4 is connected to each of cathodes of diodes D3 and D4. Terminals T0 to T4 of semiconductor module M4 are connected to terminals T0 to T4, respectively, of semiconductor module M5. The same effect as that in the first embodiment can be achieved also in the present modification.

Figure 10:
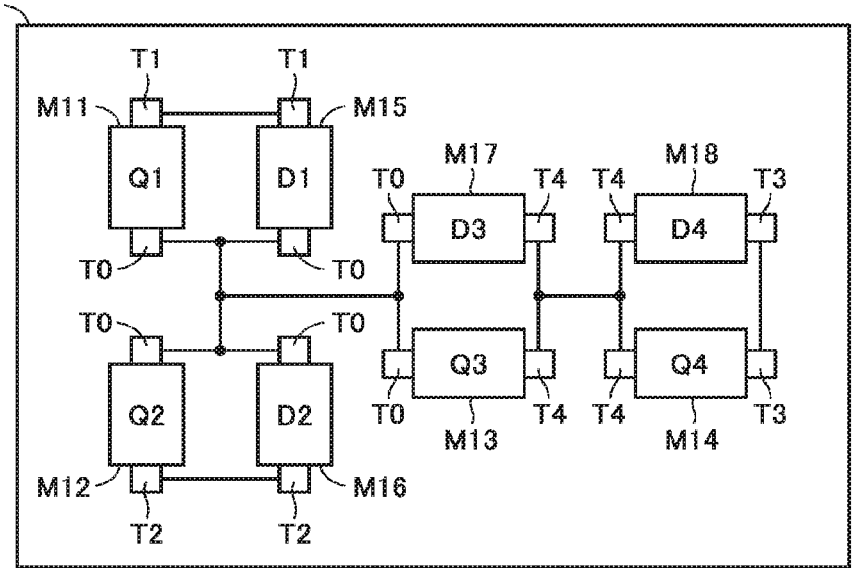
FIG. 10 is a circuit block diagram showing still another modification of the first embodiment.

FIG. 10 is a block diagram showing still another modification of the first embodiment, which is shown as compared with FIG. 6. In FIG. 10, in the present modification, a converter includes a substrate BP3 and eight semiconductor modules M11 to M18 mounted on its surface. Semiconductor modules M11 to M14 are provided on their insides with transistors Q1 to Q4, respectively. Semiconductor modules M15 to M18 are provided on their insides with diodes D1 to D4, respectively. Each of semiconductor modules M11 and M15 includes terminals T0 and T1. Each of semiconductor modules M12 and M16 includes terminals T0 and T2. Terminals T1 of semiconductor modules M11 and M15 are connected to each other. Terminals T2 of semiconductor modules M12 and M16 are connected to each other.

Each of semiconductor modules M13 and M17 includes terminals T0 and T4. Each of semiconductor modules M14 and M18 includes terminals T3 and T4. Terminals T4 of semiconductor modules M13 and M14 are connected to drains of transistors Q3 and Q4, respectively. Terminals T4 of semiconductor modules M17 and M18 are connected to cathodes of diodes D3 and D4, respectively. Terminals T0 of semiconductor modules M11 to M13 and M15 to M17 are connected to each other. Terminals T4 of semiconductor modules M13, M14, M17, and M18 are connected to each other. Terminals T3 of semiconductor modules M14 and M18 are connected to each other. Furthermore, semiconductor modules M11 to M14 are provided on their outsides with four signal terminals (not shown) used for supplying PWM signals $\phi1$ to $\phi4$ to the gates of transistors Q1 to Q4, respectively. The same effect as that in the first embodiment can be achieved also in the present modification.

Second Embodiment

Figure 11:
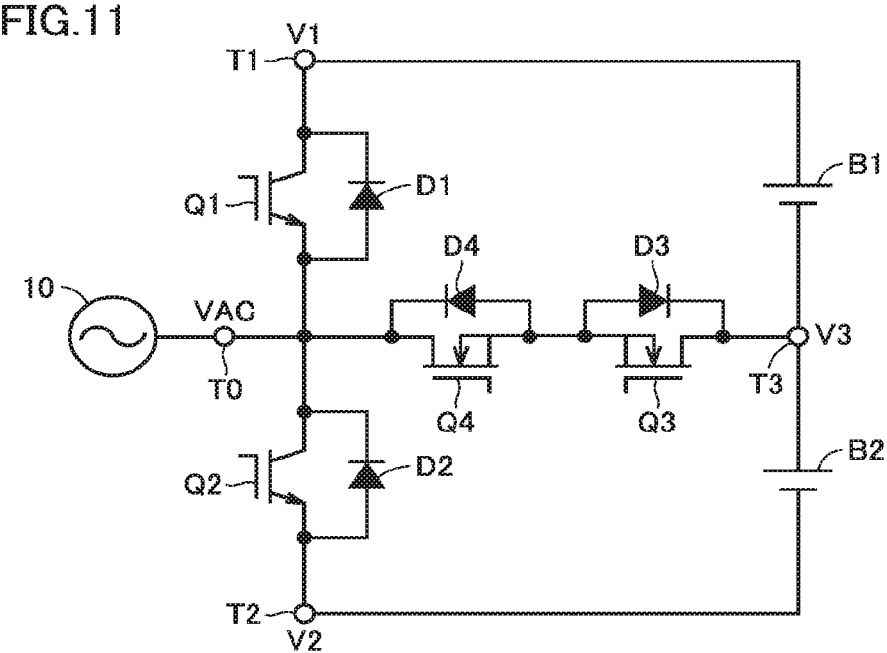
FIG. 11 is a circuit block diagram showing the configuration of a converter according to the second embodiment of the present invention.

FIG. 11 is a circuit diagram showing the configuration of a converter according to the second embodiment of the present invention, which is shown as compared with FIG. 1. Referring to FIG. 11, this converter is different from the converter in FIG. 1 in that the parallel connection body formed of transistor Q3 and diode D3 and the parallel connection body formed of transistor Q4 and diode D4 are replaced with each other.

Transistors Q3 and Q4 have: sources that are connected to each other; and drains that are connected to output terminal T3 and input terminal T0, respectively. Diodes D3 and D4 have: anodes that are connected to sources of transistors Q3 and Q4, respectively; and cathodes that are connected to output terminal T3 and input terminal T0, respectively. In other words, diodes D3 and D4 are connected in anti-parallel to transistors Q3 and Q4, respectively. Transistors Q1 to Q4 are controlled by PWM signals ϕ1 to ϕ4, respectively. When AC voltage VAC is a positive voltage, transistor Q3 is turned on while transistors Q1 and Q4 are alternately turned on. Furthermore, when AC voltage VAC is a negative voltage, transistor Q4 is turned on while transistors Q2 and Q3 are alternately turned on.

Since other configurations and operations are the same as those in the first embodiment, the description thereof will not be repeated. The same effect as that in the first embodiment can be achieved also in the present second embodiment.

Third Embodiment

Figure 12:
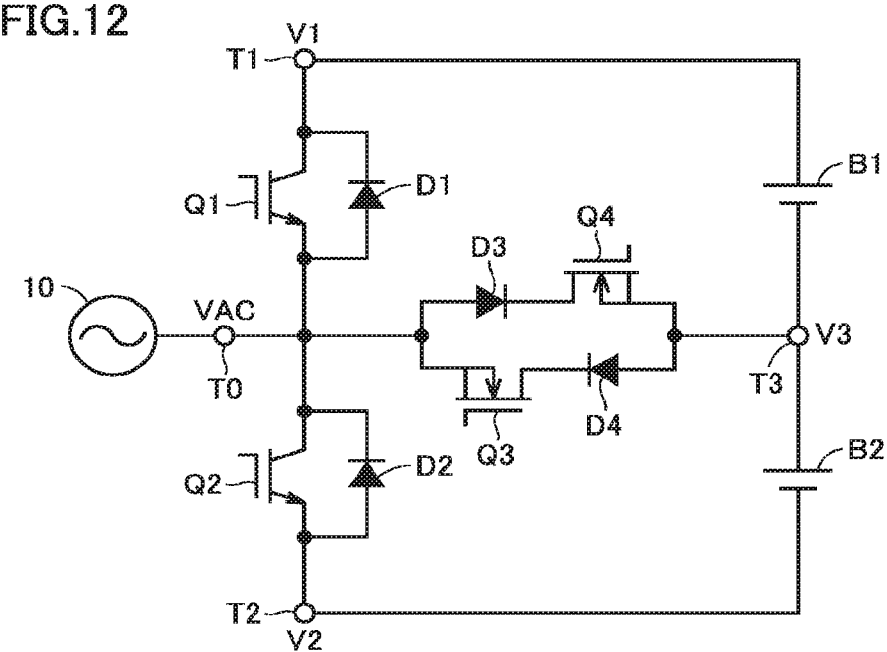
FIG. 12 is a circuit block diagram showing the configuration of a converter according to the third embodiment of the present invention.

FIG. 12 is a circuit diagram showing the configuration of a converter according to the third embodiment of the present invention, which is shown as compared with FIG. 1. Referring to FIG. 12, this converter is different from the converter in FIG. 1 in that: the drains of transistors Q3 and Q4 are separated from the cathodes of diodes D3 and D4; the drain of transistor Q3 and the cathode of diode D4 are connected to each other; and the drain of transistor Q4 and the cathode of diode D3 are connected to each other.

Transistors Q1 to Q4 are controlled by PWM signals ϕ1 to ϕ4, respectively. When AC voltage VAC is a positive voltage, transistor Q3 is turned on while transistors Q1 and Q4 are alternately turned on. Also, when AC voltage VAC is a negative voltage, transistor Q4 is turned on while transistors Q2 and Q3 are alternately turned on.

Since other configurations and operations are the same as those in the first embodiment, the description thereof will not be repeated. The same effect as that in the first embodiment can be achieved also in the present third embodiment.

Fourth Embodiment

Figure 13:
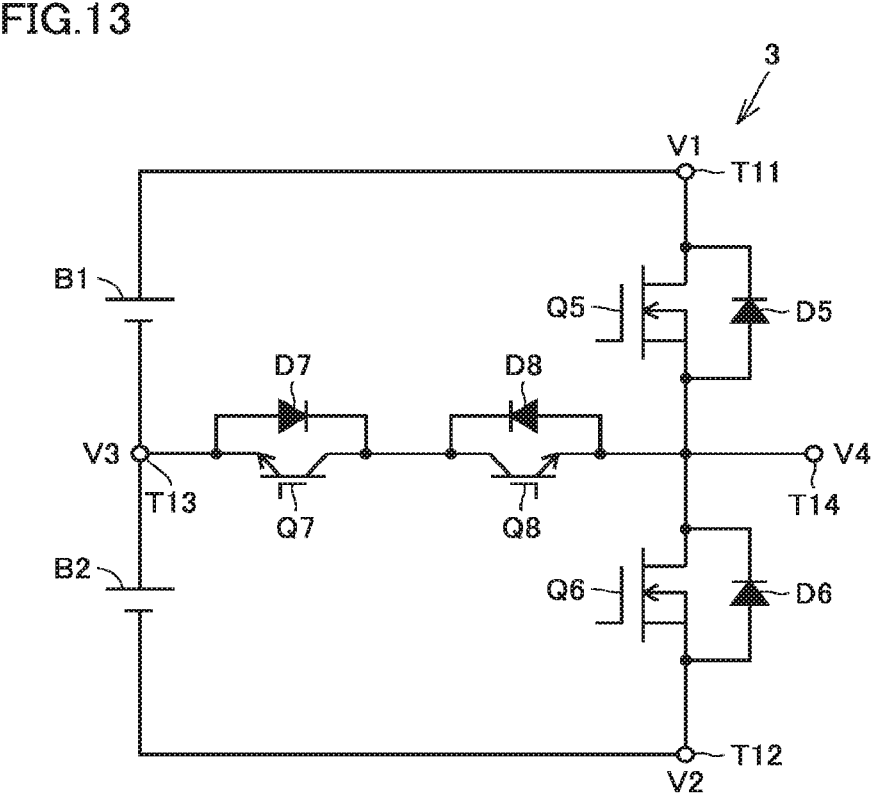
FIG. 13 is a circuit block diagram showing the configuration of an inverter included in an uninterruptible power supply device according to the fourth embodiment of the present invention.

FIG. 13 is a circuit block diagram showing the configuration of inverter 3 included in an uninterruptible power supply device according to the fourth embodiment of the present invention. The entire configuration of the uninterruptible power supply device is as shown in FIG. 7. Converter 2 included in the uninterruptible power supply device corresponds to a converter shown in FIG. 1, 11, or 12. In FIG. 13, this inverter 3 includes input terminals T11 to T13, an output terminal T14, transistors Q5 to Q8, and diodes D5 to D8.

Input terminals T11 to T13 are connected to DC positive bus L1, DC negative bus L2, and DC neutral point bus L3, respectively, in FIG. 7. Battery B1 has a positive electrode and a negative electrode that are connected to input terminals T11 and T13, respectively. Battery B2 has a positive electrode and a negative electrode that are connected to input terminals T13 and T12, respectively. Each of batteries B1 and B2 outputs a DC voltage. The output voltage of battery B1 and the output voltage of battery B2 are equal to each other. Accordingly, DC voltages V1, V2 and V3 are applied to input terminals T11, T12, and T13, respectively, which leads to conditions of V1>V3>V2 and V3=(V1+V2)/2. This inverter serves to convert DC voltages V1 to V3, which have been applied to input terminals T11 to T13, into a three-level AC voltage V4, and outputs the converted three-level AC voltage V4 through output terminal T14. In addition, if input terminal T13 is grounded, DC voltages V1, V2 and V3 are to be set at a positive voltage, a negative voltage and 0V, respectively.

Each of transistors Q5 and Q6 is an N-channel MOS transistor formed using SiC (silicon carbide) that is a wide band gap semiconductor. The rated current in each of transistors Q5 and Q6 is, for example, 600 A that is larger than the rated current in each of transistors Q7, Q8 and diodes D5 to D8.

Each of transistors Q7 and Q8 is an IGBT formed using Si (silicon) that is a semiconductor other than a wide band gap semiconductor. The rated current in each of transistors Q7 and Q8 is 450 A, for example.

Each of diodes D5 and D6 is formed using Si (silicon) that is a semiconductor other than a wide band gap semiconductor. The rated current in each of diodes D5 and D6 is 300 A, for example.

Each of diodes D7 and D8 is a Schottky barrier diode formed using SiC (silicon carbide) that is a wide band gap semiconductor. The rated current in each of diodes D7 and D8 is 500 A, for example.

In this way, transistors Q5 and Q6 are different in specification from transistors Q7 and Q8, and diodes D5 and D6 are different in specification from diodes D7 and D8, the reason for which will be described later.

Transistor Q5 has: a drain (the first electrode) connected to input terminal T11 (the first output terminal); and a source (the second electrode) connected to output terminal T14 (the fourth output terminal). Diode D5 has: an anode connected to output terminal T14; and a cathode connected to input terminal T11.

Transistor Q6 has: a drain connected to output terminal T14; and a source connected to input terminal T12 (the second output terminal). Diode D6 has: an anode connected to input terminal T12; and a cathode connected to output terminal T14. In other words, diodes D5 and D6 are connected in anti-parallel to transistors Q5 and Q6, respectively.

Transistors Q7 and Q8 have collectors (the first electrodes) that are connected to each other. Transistors Q7 and Q8 have emitters (the second electrodes) that are connected to input terminal T13 (the third output terminal) and output terminal T14, respectively. Diodes D7 and D8 have: cathodes that are connected to collectors of transistors Q7 and Q8; and anodes that are connected to input terminal T13 and output terminal T14, respectively. In other words, diodes D7 and D8 are connected in anti-parallel to transistors Q7 and Q8, respectively. Transistors Q7, Q8 and diodes D7, D8 form the second bidirectional switch.

Figure 14:
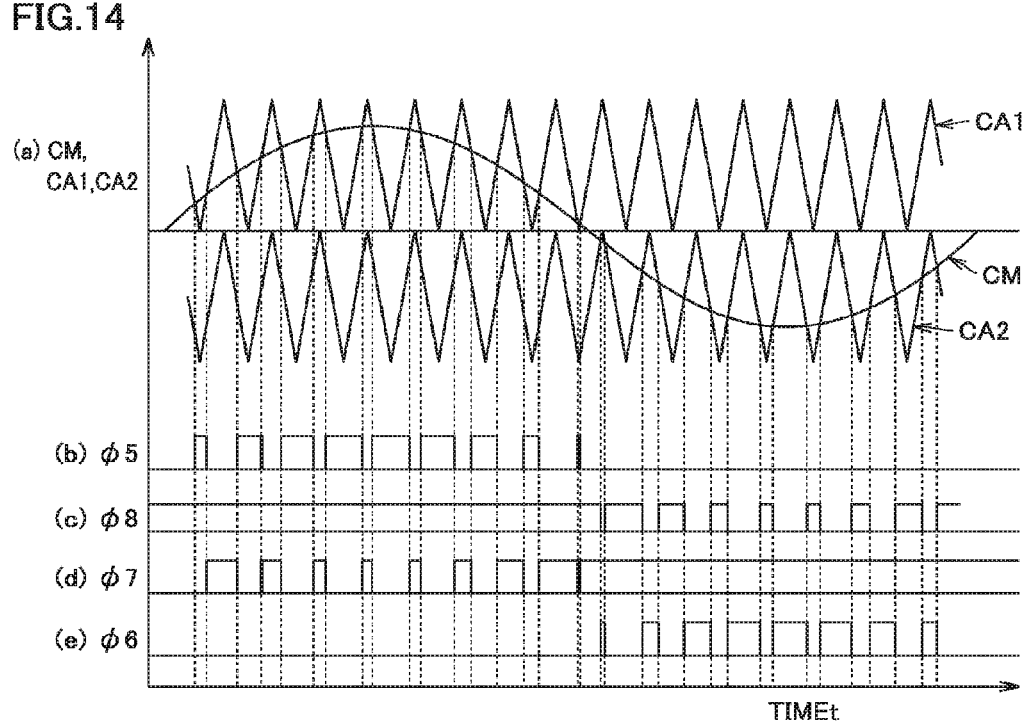
FIG. 14 is a time chart showing waveforms of four PWM signals controlling four transistors, respectively, shown in FIG. 13.

Then, the operation of this inverter will be hereinafter described. PWM signals ϕ5 to ϕ8 are supplied to the gates of transistors Q5 to Q8, respectively. FIGS. 14(a) to 14(e) each show a method of generating PWM signals ϕ5 to ϕ8 and waveforms. Specifically, FIG. 14(a) shows waveforms of sinusoidal wave command value signal CM, positive-side triangular wave carrier signal CA1 and negative-side triangular wave carrier signal CA2, and FIGS. 14(b), 14(c), 14(d), and 14(e) show waveforms of PWM signals ϕ5, ϕ8, ϕ7, and ϕ6, respectively.

In FIGS. 14(a) to 14(e), the frequency of sinusoidal wave command value signal CM is a commercial frequency, for example. Carrier signals CA1 and CA2 have the same cycle and the same phase. The cycles of carrier signals CA1 and CA2 are sufficiently smaller than the cycle of sinusoidal wave command value signal CM.

The high-low levels of sinusoidal wave command value signal CM and positive-side triangular wave carrier signal CA1 are compared with each other. When the level of sinusoidal wave command value signal CM is higher than the level of positive-side triangular wave carrier signal CA1, PWM signals ϕ5 and ϕ7 are set at an "H" level and an "L" level, respectively. When the level of sinusoidal wave command value signal CM is lower than the level of positive-side triangular wave carrier signal CA1, PWM signals ϕ5 and ϕ7 are set at an "L" level and an "H" level, respectively.

Accordingly, in a time period during which the level of sinusoidal wave command value signal CM is positive, PWM signals ϕ5 and ϕ7 are alternately set at an "H" level in synchronization with carrier signal CA1, and thus, transistors Q5 and Q7 are alternately turned on. Furthermore, in a time period during which the level of sinusoidal wave command value signal CM is negative, PWM signals ϕ5 and ϕ7 are fixed at an "L" level and an "H" level, respectively, so that transistor Q5 is fixed in an OFF state and transistor Q7 is fixed in an ON state.

The high-low levels of sinusoidal wave command value signal CM and negative-side triangular wave carrier signal CA2 are compared with each other. When the level of sinusoidal wave command value signal CM is higher than the level of positive-side triangular wave carrier signal CA2, PWM signals ϕ6 and ϕ8 are set at an "L" level and an "H" level, respectively. When the level of sinusoidal wave command value signal CM is lower than the level of positive-side triangular wave carrier signal CA2, PWM signals ϕ6 and ϕ8 are set at an "H" level and an "L" level, respectively.

Accordingly, in a time period during which the level of sinusoidal wave command value signal CM is positive, PWM signals ϕ6 and ϕ8 are fixed at the "L" level and the "H" level, respectively, and thus, transistor Q6 is fixed in the OFF state and transistor Q8 is fixed in the ON state. Furthermore, in a time period during which the level of sinusoidal wave command value signal CM is negative, PWM signals ϕ6 and ϕ8 are alternately set at an "H" level in synchronization with carrier signal CA2, and transistors Q6 and Q8 are alternately turned on.

The ratio between the time in which the PWM signal is set at an "H" level within one cycle and the time of one cycle of the PWM signal is referred to as a duty ratio. In a time period during which the level of sinusoidal wave command value signal CM is positive, the duty ratio of PWM signal ϕ5 is maximized in the vicinity of a positive peak (90 degrees) of sinusoidal wave command value signal CM. Also, the duty ratio of PWM signal ϕ5 decreases with increasing distance from the peak, and reaches 0 in the vicinity of 0 degree and 180 degrees. The duty ratio of PWM signal ϕ5 is fixed at 0 in a time period during which sinusoidal wave command value signal CM is negative. PWM signal ϕ7 is a complementary signal of PWM signal ϕ5.

The duty ratio of PWM signal ϕ6 is fixed at 0 in a time period during which the level of sinusoidal wave command value signal CM is positive. The duty ratio of PWM signal ϕ6 is maximized in the vicinity of a negative peak (270 degrees) of sinusoidal wave command value signal CM. Also, the duty ratio of PWM signal ϕ6 decreases with increasing distance from the peak, and reaches 0 in the vicinity of 180 degrees and 360 degrees. PWM signal ϕ8 is a complementary signal of PWM signal ϕ6.

Figure 15:
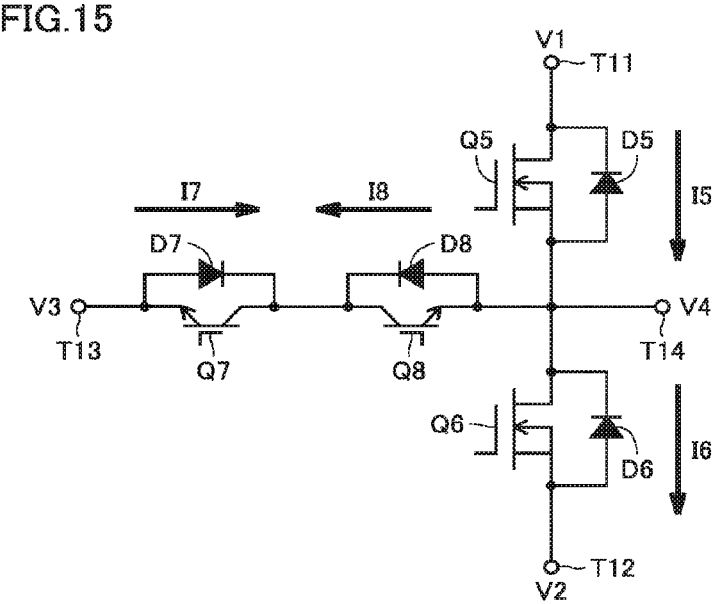
FIG. 15 is a circuit diagram for illustrating a current flowing through the inverter shown in FIG. 13.

Then, the current flowing through each of transistors Q5 to Q8 and diodes D5 to D8 during the operation of the inverter will be hereinafter described. As shown in FIG. 15, the current flowing from input terminal T11 into output terminal T14 is defined as I5; the current flowing from output terminal T14 into input terminal T12 is defined as I6; the current flowing from input terminal T13 into output terminal T14 is defined as I7; and the current flowing from output terminal T14 into input terminal T13 is defined as I8.

Figure 16:
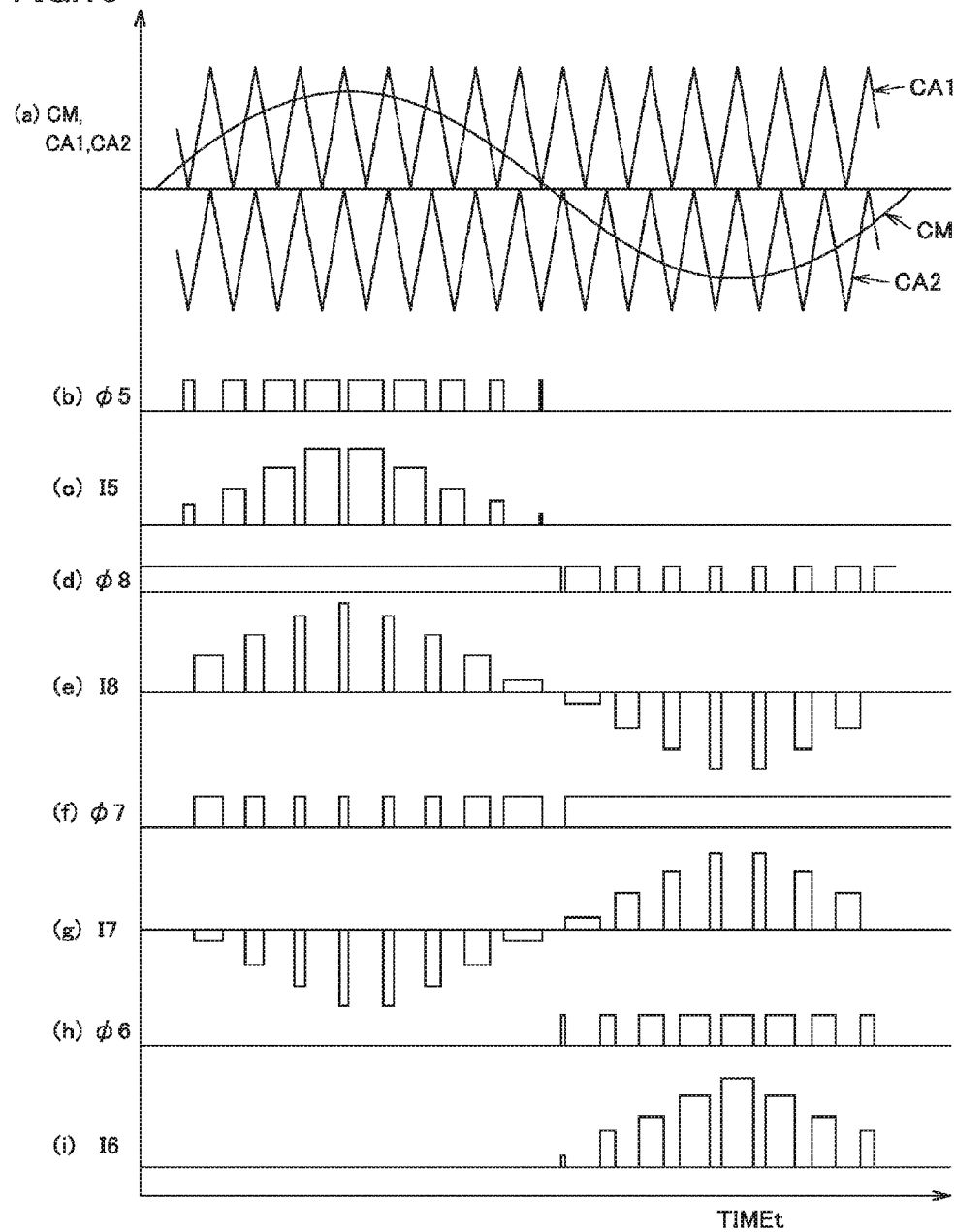
FIG. 16 is a time chart showing the current flowing through the inverter shown in FIG. 13.

FIGS. 16(a) to 16(i) are time charts each showing the operation of an inverter. Specifically, FIG. 16(a) shows waveforms of sinusoidal wave command value signal CM, positive-side triangular wave carrier signal CA1 and negative-side triangular wave carrier signal CA2. FIGS. 16(b), 16(d), 16(f), and 16(h) show waveforms of PWM signals ϕ5, ϕ8, ϕ7, and ϕ6, respectively. FIGS. 16(c), 16(e), 16(g), and 16(i) show waveforms of currents I5, I8, I7, and I6, respectively. Among currents I5 to I8, a positive current shows a current flowing through transistor Q while a negative current shows a current flowing through diode D. The figures also show the case where the power factor is 1.0.

In FIGS. 16(a) to 16(i), in a time period during which the level of sinusoidal wave command value signal CM is positive, PWM signals ϕ8 and ϕ6 are fixed at an "H" level and an "L" level, respectively, and PWM signals ϕ5 and ϕ7 are alternately set at an "H" level. Accordingly, transistors Q8 and Q6 are fixed in the ON state and the OFF state, respectively, and transistors Q5 and Q7 are alternately turned on. Thus, DC voltages V1 and V3 alternately appear on output terminal T14.

During this time period, current I5 of the level corresponding to the ON time of transistor Q5 flows when transistor Q5 is turned on, and current I7 of the level complementing current I5 in a passage of diode D7 and transistor Q8 flows when transistor Q5 is turned off.

Since transistor Q6 is fixed in the OFF state, no current flows through transistor Q6, so that switching loss does not occur in transistor Q6. Transistor Q7 is turned on/off, but a current flows through diode D7 while no current flows through transistor Q7, so that switching loss does not occur in transistor Q7. Since transistor Q8 is fixed in the ON state, a current flows through transistor Q8, but switching loss does not occur in transistor Q8. Accordingly, during this time period, among transistors Q5 to Q8, the current flowing through transistor Q5 shows the largest effective value while the greatest switching loss occurs in transistor Q5.

Each time transistor Q5 is changed from the OFF state to the ON state, a reverse bias voltage is applied to diode D7, and this diode D7 performs a reverse recovery operation. No current flows through other diodes D5, D6 and D8 during this time period.

In a time period during which the level of sinusoidal wave command value signal CM is negative, PWM signals ϕ7 and ϕ5 are fixed at an "H" level and an "L" level, respectively, and PWM signals ϕ6 and ϕ8 are alternately set at an "H" level. Accordingly, transistors Q7 and Q5 are fixed in the ON state and the OFF state, respectively, and transistors Q6 and Q8 are alternately turned on. Thus, DC voltages V2 and V3 appear alternately on output terminal T14.

During this time period, current I6 of the level corresponding to the ON time of transistor Q6 flows when transistor Q6 is turned on, and current I7 flows through a passage of diode D8 and transistor Q7 when transistor Q6 is turned off.

Since transistor Q5 is fixed in the OFF state, a current does not flow through transistor Q5, so that switching loss does not occur in transistor Q5. Although transistor Q8 is turned on/off, a current flows through diode D8 while a current does not flow through transistor Q8, so that switching loss does not occur in transistor Q8. Since transistor Q7 is fixed in the ON state, a current flows through transistor Q7, but switching loss does not occur in transistor Q7. Accordingly, during this time period, among transistors Q5 to Q8, the current flowing through transistor Q6 shows the largest effective value while the greatest switching loss occurs in transistor Q6.

Furthermore, each time transistor Q6 is changed from the OFF state to the ON state, a reverse bias voltage is applied to diode D8, and this diode D8 performs a reverse recovery operation. Also, no current flows through other diodes D5, D6 and D7 during this time period.

In summary, a large current flows through each of transistors Q5 and Q6, and thus, switching loss occurs in transistors Q5 and Q6. The current flowing through transistors Q7 and Q8 is smaller than the current flowing through transistors Q5 and Q6, and thus, switching loss does not occur in transistors Q7 and Q8.

Accordingly, as described above, as transistors Q5 and Q6, an N-channel MOS transistor is employed that is formed of SiC as a wide band gap semiconductor and that has a rated current of a relatively large value (for example, 600 A), thereby reducing switching loss. Also, as transistors Q7 and Q8, an IGBT is employed that is formed of Si as a semiconductor other than a wide band gap semiconductor and that has a rated current of a relatively small value (for example, 450 A), thereby reducing cost.

A current flowing through diodes D7 and D8 is comparable to the current flowing through transistors Q7 and Q8. These diodes D7 and D8 each perform a reverse recovery operation. No current flows through diodes D5 and D6. In addition, as is well known, diodes D5 and D6 are provided in order to protect transistors Q5 and Q6 from the voltage generated in the inductor when this inductor is used as a load.

Accordingly, as described above, as diodes D7 and D8, a Schottky barrier diode is employed that is formed of SiC as a wide band gap semiconductor and that has a rated current of a value comparable to those of transistors Q7 and Q8 (for example, 500 A), thereby reducing the recovery loss occurring during the reverse recovery operation. As diodes D5 and D6, a diode is employed that is formed of Si as a semiconductor other than a wide band gap semiconductor and that has a rated current of a relatively small value (for example, 300 A), thereby reducing cost.

Figure 17:
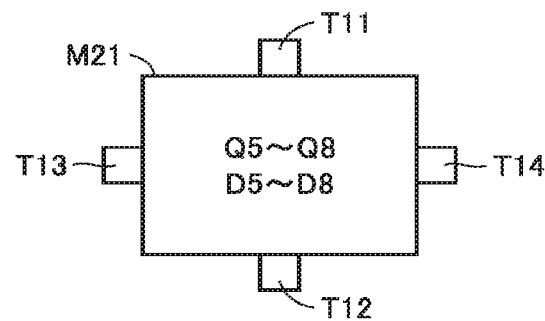
FIG. 17 is a block diagram showing the configuration of a semiconductor module included in the inverter shown in FIG. 13.

FIG. 17 is a diagram showing the external appearance of inverter 3 shown in FIG. 13. In FIG. 17, inverter 3 includes one semiconductor module M21. Semiconductor module M21 is provided on its inside with transistors Q5 to Q8 and diodes D5 to D8. Semiconductor module M21 is provided on its outside with input terminals T11 to T13 and an output terminal T14. Furthermore, semiconductor module M21 is provided on its outside with four signal terminals used for supplying PWM signals $\phi 5$ to $\phi 8$ to the gates of transistors Q5 to Q8, respectively, but these four signal terminals are not shown for simplification of illustration of the figure.

As described above, in the present fourth embodiment, an N-channel MOS transistor formed of a wide band gap semiconductor is used as transistors Q5 and Q6 that turn on/off a current, and an IGBT formed of a semiconductor other than a wide band gap semiconductor is used as transistors Q7 and Q8 that do not turn on/off a current. Accordingly, the switching loss and the cost can be reduced.

Furthermore, a Schottky barrier diode formed of a wide band gap semiconductor is used as diodes D7 and D8 performing a reverse recovery operation, and a diode formed of a semiconductor other than a wide band gap semiconductor is used as diodes D5 and D6 not performing a reverse recovery operation. Accordingly, the recovery loss and the cost can be reduced.

In addition, in the present fourth embodiment, SiC is used as a wide band gap semiconductor, but not limited thereto, and any other semiconductors may be used as long as such semiconductors are a wide band gap semiconductor. For example, GaN (gallium nitride) may be used as a wide band gap semiconductor.

Figure 18:
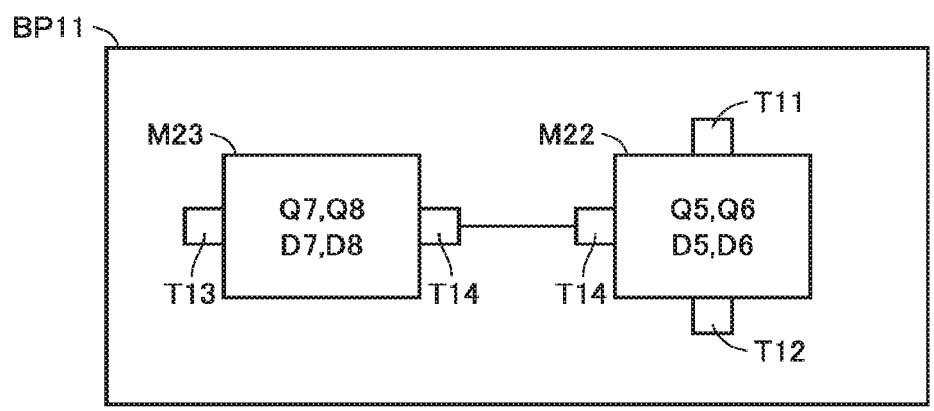
FIG. 18 is a circuit block diagram showing a modification of the fourth embodiment.

FIG. 18 is a block diagram showing a modification of the fourth embodiment, which is shown as compared with FIG. 17. In FIG. 18, in the present modification, inverter 3 includes a substrate BP11, and two semiconductor modules M22 and M23 mounted on its surface. Semiconductor module M22 is provided on its inside with transistors Q5, Q6 and diodes D5, D6. Semiconductor module M22 is provided on its outside with input terminals T11, T12 and an output terminal T14. Furthermore, semiconductor module M22 is provided on its outside with two signal terminals (not shown) used for supplying PWM signals $\phi 5$ and $\phi 6$ to the gates of transistors Q5 and Q6.

Semiconductor module M23 is provided on its inside with transistors Q7, Q8 and diodes D7, D8. Semiconductor module M23 is provided on its outside with an input terminal T13 and an output terminal T14. Semiconductor module M23 is provided on its outside with two signal terminals (not shown) used for supplying PWM signals $\phi 7$ and $\phi 8$ to the gates of transistors Q7 and Q8. Output terminal T14 of semiconductor module M22 and output terminal T14 of semiconductor module M23 are connected to each other. The same effect as that in the fourth embodiment can be achieved also in the present modification.

Figure 19:
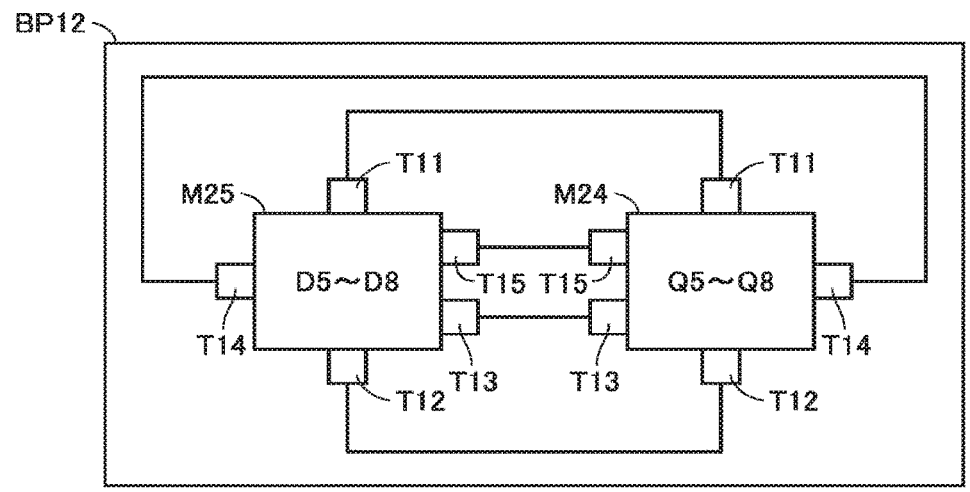
FIG. 19 is a circuit block diagram showing another modification of the fourth embodiment.

FIG. 19 is a block diagram showing another modification of the fourth embodiment, which is shown as compared with FIG. 17. In FIG. 19, in the present modification, the inverter includes a substrate BP12, and two semiconductor modules M24 and M25 mounted on its surface. Semiconductor module M24 is provided on its inside with transistors Q5 to Q8. Semiconductor module M24 is provided on its outside with input terminals T11 to T13, an output terminal T14, and an intermediate terminal T15. Intermediate terminal T15 is connected to the emitter of each of transistors Q7 and Q8. Semiconductor module M24 is provided on its outside with four signal terminals (not shown) used for supplying PWM signals $\phi 5$ to $\phi 8$ to the gates of transistors Q5 to Q8.

Semiconductor module M25 is provided on its inside with diodes D5 to D8. Semiconductor module M25 is provided on its outside with input terminals T11 to T13, an output terminal T14, and an intermediate terminal T15. Intermediate terminal T15 is connected to the anode of each of diodes D7 and D8. Terminals T11 to T15 of semiconductor module M24 are connected to terminals T11 to T15, respectively, of semiconductor module M25. The same effect as that in the fourth embodiment can be achieved also in the present modification.

Figure 20:
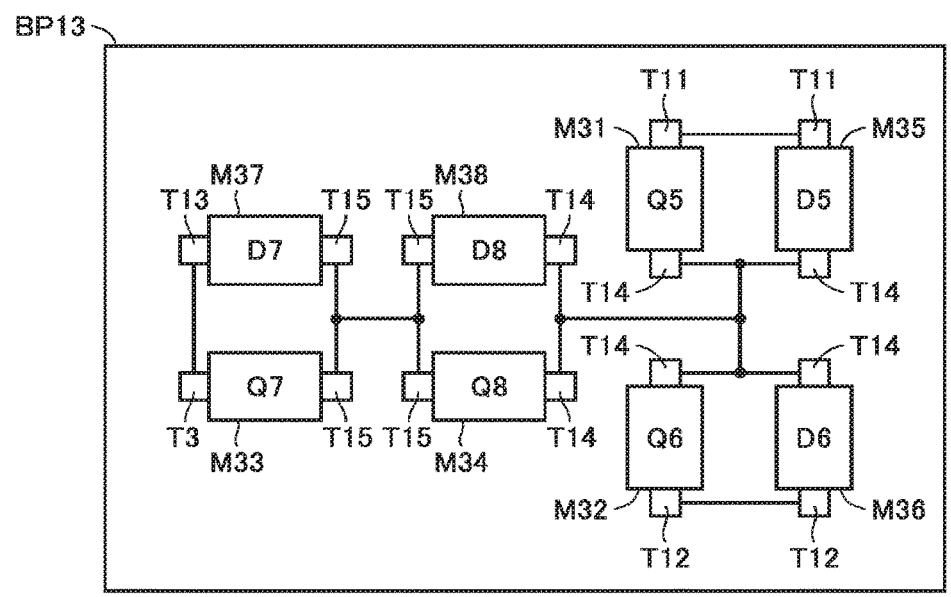
FIG. 20 is a circuit block diagram showing still another modification of the fourth embodiment.

FIG. 20 is a block diagram showing still another modification of the fourth embodiment, which is shown as compared with FIG. 17. In FIG. 20, in the present modification, an inverter 3 includes a substrate BP13 and eight semiconductor modules M31 to M38 mounted on its surface. Semiconductor modules M31 to M34 are provided on their insides with transistors Q5 to Q8, respectively. Semiconductor modules M35 to M38 are provided on their insides with diodes D5 to D8, respectively. Each of semiconductor modules M31 and M35 includes terminals T11 and T14. Each of semiconductor modules M32 and M36 includes terminals T12 and T14. Terminals T11 of semiconductor modules M31 and M35 are connected to each other. Terminals T12 of semiconductor modules M32 and M16 are connected to each other.

Each of semiconductor modules M33 and M37 includes terminals T13 and T15, and each of semiconductor modules M34 and M38 includes terminals T14 and T5. Terminals T15 of semiconductor modules M33 and M34 are connected to the collectors of transistors Q7 and Q8, respectively. Terminals T15 of semiconductor modules M37 and M38 are connected to the cathodes of diodes D7 and D8, respectively. Terminals T13 of semiconductor modules M33 and M37 are connected to each other. Terminals T15 of semiconductor modules M33, M34, M37, and M38 are connected to each other. Terminals T14 of semiconductor modules M31, M32, M34 to M36, and M38 are connected to each other. Furthermore, semiconductor modules M31 to 34 are provided on their outsides with four signal terminals (not shown) used for supplying PWM signals $\phi 5$ and $\phi 8$ to the gates of transistors Q5 to Q8. The same effect as that in the first embodiment can be achieved also in the present modification.

Fifth Embodiment

Figure 21:
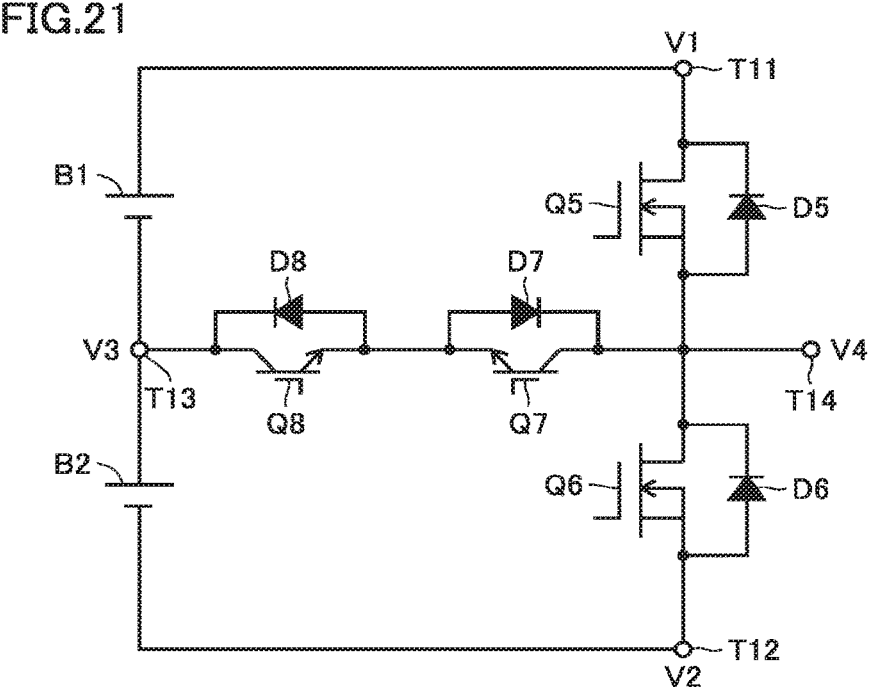
FIG. 21 is a circuit block diagram showing the configuration of an inverter according to the fifth embodiment of the present invention.

FIG. 21 is a circuit diagram showing the configuration of an inverter according to the fifth embodiment of the present invention, which is shown as compared with FIG. 13. Referring to FIG. 21, this inverter is different from inverter 3 in FIG. 13 in that the parallel connection body formed of transistor Q7 and diode D7 and the parallel connection body formed of transistor Q8 and diode D8 are replaced with each other.

Transistors Q7 and Q8 have: emitters that are connected to each other; and collectors that are connected to an input terminal T13 and an output terminal T14, respectively. Transistors Q5 to Q8 are controlled by PWM signals $\phi 5$ to $\phi 8$, respectively. When DC voltages V1 and V3 are alternately output through output terminal T14, transistor Q8 is turned on while transistors Q5 and Q7 are alternately turned on. Furthermore, when DC voltages V2 and V3 are alternately output through output terminal T14, transistor Q7 is turned on while transistors Q6 and Q8 are alternately turned on.

Since other configurations and operations are the same as those in the fourth embodiment, the description thereof will not be repeated. The same effect as that in the fourth embodiment can be achieved also in the present fifth embodiment.

Sixth Embodiment

Figure 22:
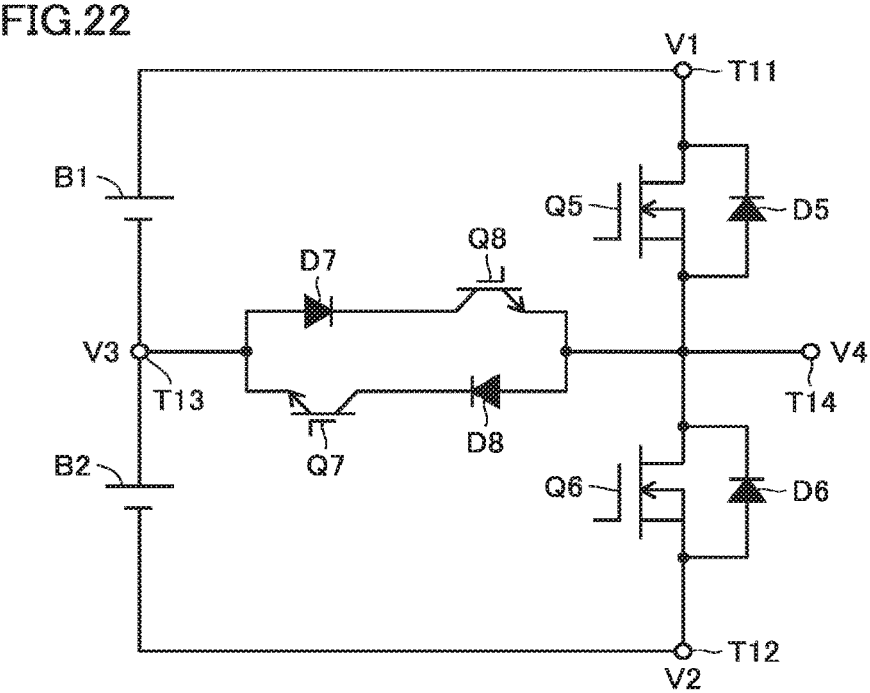
FIG. 22 is a circuit block diagram showing the configuration of an inverter according to the sixth embodiment of the present invention.

FIG. 22 is a circuit diagram showing the configuration of an inverter according to the sixth embodiment of the present invention, which is shown as compared with FIG. 13. Referring to FIG. 22, this inverter is different from the inverter in FIG. 13 in that: the collectors of transistors Q7 and Q8 are separated from the cathodes of diodes D7 and D8; the collector of transistor Q7 and the cathode of diode D8 are connected to each other; and the collector of transistor Q8 and the cathode of diode D7 are connected to each other.

Transistors Q5 to Q8 are controlled by PWM signals $\phi 5$ to $\phi 8$, respectively. When DC voltages V1 and V3 are alternately output through output terminal T14, transistor Q8 is turned on while transistors Q5 and Q7 are alternately turned on. Furthermore, when DC voltages V2 and V3 are alternately output through output terminal T14, transistor Q7 is turned on while transistors Q6 and Q8 are alternately turned on.

Since other configurations and operations are the same as those in the fourth embodiment, the description thereof will not be repeated. The same effect as that in the fourth embodiment can be achieved also in the present sixth embodiment.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST

T0, T11 to T13 input terminal, T1 to T3, T14 output terminal, T4, T14, T15 intermediate terminal, Q1 to Q8 transistor, D1 to D8 diode, B1, B2 battery, M1 to M5, M11 to M18, M21 to M25, M31 to M38 semiconductor module, BP1 to BP3, BP11 to BP13 substrate, 1 input filter, 2 converter, L1 DC positive bus, L2 DC negative bus, L3 DC neutral point bus, C1, C2 capacitor, 3 inverter, 4 output filter, 5 controller, 10 commercial AC power supply, 11 load.

The invention claimed is:

1. A converter configured to convert an AC voltage applied to an input terminal into a first DC voltage, a second DC voltage and a third DC voltage, and output the first DC voltage, the second DC voltage and the third DC voltage through a first output terminal, a second output terminal and a third output terminal, respectively, the converter comprising:
   a first transistor having a first electrode and a second electrode that are connected to the first output terminal and the input terminal, respectively;
   a second transistor having a first electrode and a second electrode that are connected to the input terminal and the second output terminal, respectively;
   a first diode and a second diode connected in anti-parallel to the first transistor and the second transistor, respectively; and
   a first bidirectional switch connected between the input terminal and the third output terminal,
   the first DC voltage being higher than the second DC voltage, and the third DC voltage being an intermediate voltage between the first DC voltage and the second DC voltage,
   the first bidirectional switch including a third transistor, a fourth transistor, a third diode, and a fourth diode,
   each of the first diode, the second diode, the third transistor, and the fourth transistor being formed of a wide band gap semiconductor,
   each of the third diode, the fourth diode, the first transistor, and the second transistor being formed of a semiconductor other than the wide band gap semiconductor, and
   each of the first diode and the second diode being greater in rated current than each of the third diode, the fourth diode, the first transistor, the second transistor, the third transistor, and the fourth transistor.

2. The converter according to claim 1, wherein
   a first electrode of the third transistor and a first electrode of the fourth transistor are connected to each other,
   a second electrode of the third transistor is connected to the input terminal, a second electrode of the fourth transistor is connected to the third output terminal, the third diode and the fourth diode are connected in anti-parallel to the third transistor and the fourth transistor, respectively, when the AC voltage is a positive voltage, the third transistor is turned on and the first transistor and the fourth transistor are alternately turned on, and when the AC voltage is a negative voltage, the fourth transistor is turned on and the second transistor and the third transistor are alternately turned on.

3. The converter according to claim 1, comprising a semiconductor module including the first transistor, the second transistor, the third transistor, the fourth transistor, the first diode, the second diode, the third diode, and the fourth diode.

4. The converter according to claim 1, comprising:
a first semiconductor module including the first transistor, the second transistor, the first diode, and the second diode; and
a second semiconductor module including the third transistor, the fourth transistor, the third diode, and the fourth diode.

5. The converter according to claim 1, comprising:
a first semiconductor module including the first transistor, the second transistor, the third transistor, and the fourth transistor; and
a second semiconductor module including the first diode, the second diode, the third diode, and the fourth diode.

6. The converter according to claim 1, comprising a first semiconductor module including the first transistor, a second semiconductor module including the second transistor, a third semiconductor module including the third transistor, a fourth semiconductor module including the fourth transistor, a fifth semiconductor module including the first diode, a sixth semiconductor module including the second diode, a seventh semiconductor module including the third diode, and an eighth semiconductor module including the fourth diode.

7. The converter according to claim 1, wherein the wide band gap semiconductor is SiC, and the semiconductor other than the wide band gap semiconductor is Si.

8. The converter according to claim 1, wherein each of the third transistor and the fourth transistor is greater in rated current than each of the first transistor and the second transistor.

9. A power conversion device comprising:
the converter according to claim 1; and
an inverter configured to
convert the first DC voltage, the second DC voltage and the third DC voltage applied to the first output terminal, the second output terminal and the third output terminal, respectively, into a three-level AC voltage, and
output the three-level AC voltage through a fourth output terminal,
the inverter including
a fifth transistor having a first electrode and a second electrode that are connected to the first output terminal and the fourth output terminal, respectively,
a sixth transistor having a first electrode and a second electrode that are connected to the fourth output terminal and the second output terminal, respectively,
a fifth diode and a sixth diode that are connected in anti-parallel to the fifth transistor and the sixth transistor, respectively, and a second bidirectional switch connected between the third output terminal and the fourth output terminal, the second bidirectional switch including a seventh transistor, an eighth transistor, a seventh diode, and an eighth diode, each of the fifth transistor, the sixth transistor, the seventh diode, and the eighth diode being formed of a wide band gap semiconductor, and each of the seventh transistor, the eighth transistor, the fifth diode, and the sixth diode being formed of a semiconductor other than the wide band gap semiconductor.

10. The power conversion device according to claim 9, wherein
a first electrode of the seventh transistor and a first electrode of the eighth transistor are connected to each other,
a second electrode of the seventh transistor is connected to the third output terminal,
a second electrode of the eighth transistor is connected to the fourth output terminal,
the seventh diode and the eighth diode are connected in anti-parallel to the seventh transistor and the eighth transistor, respectively,
when the first DC voltage and the third DC voltage are alternately output through the fourth output terminal, the eighth transistor is turned on and the fifth transistor and the seventh transistor are alternately turned on, and
when the second DC voltage and the third DC voltage are alternately output through the fourth output terminal, the seventh transistor is turned on and the sixth transistor and the eighth transistor are alternately turned on.

11. The power conversion device according to claim 9, wherein
a first electrode of the seventh transistor is connected to the fourth output terminal,
a first electrode of the eighth transistor is connected to the third output terminal,
a second electrode of the seventh transistor and a second electrode of the eighth transistor are connected to each other,
the seventh diode and the eighth diode are connected in anti-parallel to the seventh transistor and the eighth transistor, respectively,
when the first DC voltage and the third DC voltage are alternately output through the fourth output terminal, the eighth transistor is turned on and the fifth transistor and the seventh transistor are alternately turned on, and
when the second DC voltage and the third DC voltage are alternately output through the fourth output terminal, the seventh transistor is turned on and the sixth transistor and the eighth transistor are alternately turned on.

12. The power conversion device according to claim 9, wherein
the seventh diode and the eighth diode have
anodes that are connected to the third output terminal and the fourth output terminal, respectively, and
cathodes that are connected to first electrodes of the eighth transistor and the seventh transistor, respectively,
a second electrode of the seventh transistor is connected to the third output terminal,
a second electrode of the eighth transistor is connected to the fourth output terminal,
when the first DC voltage and the third DC voltage are alternately output through the fourth output terminal, the eighth transistor is turned on and the fifth transistor and the seventh transistor are alternately turned on, and when the second DC voltage and the third DC voltage are alternately output through the fourth output terminal, the seventh transistor is turned on and the sixth transistor and the eighth transistor are alternately turned on.

13. The power conversion device according to claim 9, wherein the wide band gap semiconductor is SiC, and the semiconductor other than the wide band gap semiconductor is Si.

14. A converter configured to convert an AC voltage applied to an input terminal into a first DC voltage, a second DC voltage and a third DC voltage, and output the first DC voltage, the second DC voltage and the third DC voltage through a first output terminal, a second output terminal and a third output terminal, respectively, the converter comprising:
 a first transistor having a first electrode and a second electrode that are connected to the first output terminal and the input terminal, respectively;
 a second transistor having a first electrode and a second electrode that are connected to the input terminal and the second output terminal, respectively;
 a first diode and a second diode connected in anti-parallel to the first transistor and the second transistor, respectively; and
 a first bidirectional switch connected between the input terminal and the third output terminal,
 the first DC voltage being higher than the second DC voltage, and the third DC voltage being an intermediate voltage between the first DC voltage and the second DC voltage,
 the first bidirectional switch including a third transistor, a fourth transistor, a third diode, and a fourth diode,
 each of the first diode, the second diode, the third transistor, and the fourth transistor being formed of a wide band gap semiconductor,
 each of the third diode, the fourth diode, the first transistor, and the second transistor being formed of a semiconductor other than the wide band gap semiconductor,
 a first electrode of the third transistor being connected to the third output terminal,
 a first electrode of the fourth transistor being connected to the input terminal,
 a second electrode of the third transistor and a second electrode of the fourth transistor being connected to each other,
 the third diode and the fourth diode being connected in anti-parallel to the third transistor and the fourth transistor, respectively,
 when the AC voltage is a positive voltage, the third transistor being turned on and the first transistor and the fourth transistor being alternately turned on, and
 when the AC voltage is a negative voltage, the fourth transistor being turned on and the second transistor and the third transistor being alternately turned on.

15. A converter configured to convert an AC voltage applied to an input terminal into a first DC voltage, a second DC voltage and a third DC voltage, and output the first DC voltage, the second DC voltage and the third DC voltage through a first output terminal, a second output terminal and a third output terminal, respectively, the converter comprising:
 a first transistor having a first electrode and a second electrode that are connected to the first output terminal and the input terminal, respectively;
 a second transistor having a first electrode and a second electrode that are connected to the input terminal and the second output terminal, respectively;
 a first diode and a second diode connected in anti-parallel to the first transistor and the second transistor, respectively; and
 a first bidirectional switch connected between the input terminal and the third output terminal,
 the first DC voltage being higher than the second DC voltage, and the third DC voltage being an intermediate voltage between the first DC voltage and the second DC voltage,
 the first bidirectional switch including a third transistor, a fourth transistor, a third diode, and a fourth diode,
 each of the first diode, the second diode, the third transistor, and the fourth transistor being formed of a wide band gap semiconductor,
 each of the third diode, the fourth diode, the first transistor, and the second transistor being formed of a semiconductor other than the wide band gap semiconductor,
 the third diode and the fourth diode having
  anodes that are connected to the input terminal and the third output terminal, respectively, and
  cathodes that are connected to first electrodes of the third transistor and the fourth transistor, respectively,
 a second electrode of the third transistor being connected to the input terminal,
 a second electrode of the fourth transistor being connected to the third output terminal,
 when the AC voltage is a positive voltage, the third transistor being turned on and the first transistor and the fourth transistor being alternately turned on, and
 when the AC voltage is a negative voltage, the fourth transistor being turned on and the second transistor and the third transistor being alternately turned on.

* * * * *